(12) United States Patent
Tsangaris et al.

(10) Patent No.: US 8,475,551 B2
(45) Date of Patent: Jul. 2, 2013

(54) GAS REFORMULATING SYSTEM USING PLASMA TORCH HEAT

(75) Inventors: Andreas Tsangaris, Ottawa (CA); Kenneth Craig Campbell, Ontario (CA); Mao Pei Cui, Ottawa (CA); Geoffrey Dobbs, Ontario (CA); Douglas Michael Feasby, Alberta (CA); Zhiyuan Shen, Ottawa (CA)

(73) Assignee: Plasco Energy Group Inc., Kanata (CA)

(*) Notice: Subject to any disclaimer, the term of this patent is extended or adjusted under 35 U.S.C. 154(b) by 545 days.

(21) Appl. No.: 11/745,414

(22) Filed: May 7, 2007

(65) Prior Publication Data

US 2007/0266633 A1    Nov. 22, 2007

Related U.S. Application Data

(60) Provisional application No. 60/798,075, filed on May 5, 2006, provisional application No. 60/864,116, filed on Nov. 2, 2006, provisional application No. 60/911,179, filed on Apr. 11, 2007, provisional application No. 60/797,973, filed on May 5, 2006.

(30) Foreign Application Priority Data

Jun. 5, 2006   (WO) ................ PCT/CA2006/000881

(51) Int. Cl.
| | |
|---|---|
| *C01B 3/36* | (2006.01) |
| *C01B 6/24* | (2006.01) |
| *C01B 3/02* | (2006.01) |
| *C10J 3/16* | (2006.01) |
| *C10J 3/00* | (2006.01) |
| *B01J 7/00* | (2006.01) |

(52) U.S. Cl.
USPC ............... 48/197 R; 48/202; 48/210; 48/61; 423/644; 423/648.1

(58) Field of Classification Search
USPC .................................................. 48/61, 197 R
See application file for complete search history.

(56) References Cited

U.S. PATENT DOCUMENTS

| | | | |
|---|---|---|---|
| 2,062,762 | A | 12/1936 | Preston |
| 3,622,493 | A | 11/1971 | Crusco |

(Continued)

FOREIGN PATENT DOCUMENTS

| | | |
|---|---|---|
| CA | 1134208 A | 10/1982 |
| CA | 2343035 | 3/2000 |

(Continued)

OTHER PUBLICATIONS

Alisdair McLean, "Plasma Gasification of MSW", Presentation to the Hera Group, Nov. 28, 2006; http://www.conama8.org/modulodocumentos/documentos/SDs/SD32/SD32_ppt_AlisdairMcLean.pdf.
"A Leap Forward"; Presentation to the Ottawa Centre of Research and Innovation, Oct. 26, 2006.

(Continued)

*Primary Examiner* — Matthew Merkling
(74) *Attorney, Agent, or Firm* — K&L Gates LLP

(57) ABSTRACT

A method and apparatus is described for reformulating of an input gas from a gasification reaction into a reformulated gas. More specifically, a gas reformulating system having a gas reformulating chamber, one or more plasma torches, one or more oxygen source(s) inputs and control system is provided thereby allowing for the conversion of an input gas from a gasification reaction into a gas of desired composition.

20 Claims, 22 Drawing Sheets

U.S. PATENT DOCUMENTS

| | | | |
|---|---|---|---|
| 3,692,505 A | 9/1972 | Reichl | |
| 3,801,469 A | 4/1974 | Essenhigh | |
| 3,804,606 A | 4/1974 | Archer et al. | |
| 3,991,557 A | 11/1976 | Donath | |
| 4,028,068 A | 6/1977 | Kiener | |
| 4,141,694 A | 2/1979 | Camacho | 48/61 |
| 4,172,425 A | 10/1979 | Sheridan | |
| 4,181,504 A | 1/1980 | Camacho | 48/197 R |
| 4,208,191 A | 6/1980 | Sze | 48/210 |
| 4,229,184 A | 10/1980 | Gregg | |
| 4,272,255 A | 6/1981 | Coates | 48/63 |
| 4,291,636 A | 9/1981 | Bergsten et al. | |
| 4,400,179 A | 8/1983 | Marion et al. | |
| 4,410,336 A | 10/1983 | Blaskowski | 48/210 |
| 4,472,172 A | 9/1984 | Sheer et al. | 48/202 |
| 4,489,562 A | 12/1984 | Snyder et al. | |
| 4,534,301 A | 8/1985 | Sakash et al. | |
| 4,543,940 A | 10/1985 | Krill et al. | |
| 4,606,799 A | 8/1986 | Pirklbauer et al. | 204/170 |
| 4,615,285 A | 10/1986 | Bentell et al. | 110/346 |
| 4,644,877 A | 2/1987 | Barton et al. | |
| 4,656,956 A | 4/1987 | Flickinger et al. | |
| 4,666,462 A | 5/1987 | Martin | |
| 4,676,805 A | 6/1987 | Richter et al. | |
| 4,701,185 A | 10/1987 | Eckstein | |
| 4,749,383 A | 6/1988 | Mansfield et al. | |
| 4,838,898 A | 6/1989 | Mifflin et al. | |
| 4,881,947 A | 11/1989 | Parker et al. | |
| 4,900,429 A | 2/1990 | Richardson | |
| 4,960,380 A | 10/1990 | Cheetham | |
| 5,041,144 A | 8/1991 | Lath | |
| 5,065,206 A | 11/1991 | Nishizawa et al. | |
| 5,081,940 A | 1/1992 | Motomura et al. | |
| 5,095,825 A | 3/1992 | Arpalahti et al. | |
| 5,279,234 A | 1/1994 | Bender et al. | |
| 5,280,757 A | 1/1994 | Carter et al. | |
| 5,319,176 A | 6/1994 | Alvi et al. | |
| 5,331,906 A | 7/1994 | Sonoda et al. | 110/264 |
| 5,486,269 A | 1/1996 | Nilsson | 162/31 |
| 5,534,659 A | 7/1996 | Springer et al. | 588/227 |
| 5,541,386 A | 7/1996 | Alvi et al. | |
| 5,634,281 A | 6/1997 | Nugent | |
| 5,666,891 A | 9/1997 | Titus et al. | 110/250 |
| 5,756,957 A | 5/1998 | Titus et al. | 219/121.38 |
| 5,785,923 A | 7/1998 | Surma et al. | 266/144 |
| 5,798,497 A | 8/1998 | Titus et al. | 219/121.37 |
| 5,871,348 A | 2/1999 | Terry et al. | |
| 5,908,564 A | 6/1999 | Titus et al. | |
| 5,937,652 A | 8/1999 | Abdelmalek | |
| 5,944,034 A | 8/1999 | McRae et al. | |
| 6,084,147 A | 7/2000 | Mason | |
| 6,089,169 A | 7/2000 | Comiskey | |
| 6,112,677 A | 9/2000 | Kuntschar et al. | |
| 6,182,584 B1 | 2/2001 | Gaudio | |
| 6,200,430 B1 | 3/2001 | Robert | 204/164 |
| 6,215,678 B1 | 4/2001 | Titus et al. | 363/126 |
| 6,245,309 B1* | 6/2001 | Etievant et al. | 423/248 |
| 6,250,236 B1 | 6/2001 | Feizollahi | |
| 6,269,286 B1 | 7/2001 | Tse et al. | |
| 6,380,507 B1 | 4/2002 | Childs | 219/121.37 |
| 6,394,042 B1 | 5/2002 | West | |
| 6,630,113 B1 | 10/2003 | Surma | 422/199 |
| 6,686,556 B2 | 2/2004 | Mitchell | 219/121.48 |
| 6,810,821 B2 | 11/2004 | Chan | |
| 6,817,388 B2 | 11/2004 | Tsangaris et al. | 141/82 |
| 6,837,910 B1 | 1/2005 | Yoshikawa et al. | |
| 6,863,268 B2 | 3/2005 | Zhang | |
| 6,887,284 B2 | 5/2005 | Hudson | |
| 6,971,323 B2 | 12/2005 | Capote et al. | 110/250 |
| 7,022,293 B2 | 4/2006 | Hogan | 422/184.1 |
| 2001/0047614 A1 | 12/2001 | Swanepoel et al. | |
| 2002/0088236 A1 | 7/2002 | Arar et al. | |
| 2002/0103407 A1* | 8/2002 | Hatanaka | 585/733 |
| 2002/0144981 A1 | 10/2002 | Mitchell | 219/121.44 |
| 2003/0022035 A1* | 1/2003 | Galloway | 429/17 |
| 2003/0070808 A1 | 4/2003 | Allison | |
| 2003/0192609 A1 | 10/2003 | Enerson | |
| 2003/0209174 A1 | 11/2003 | Chan | 110/210 |
| 2003/0233788 A1 | 12/2003 | Lewis | |
| 2004/0060236 A1 | 4/2004 | Yoshikawa et al. | |
| 2004/0063798 A1 | 4/2004 | Erikstrup et al. | |
| 2004/0170210 A1 | 9/2004 | Do et al. | 373/118 |
| 2004/0244289 A1 | 12/2004 | Morozumi et al. | |
| 2004/0245086 A1* | 12/2004 | Steynberg et al. | 204/164 |
| 2004/0247509 A1 | 12/2004 | Newby | |
| 2004/0251241 A1 | 12/2004 | Blutke et al. | 219/121.59 |
| 2005/0109603 A1 | 5/2005 | Graham | |
| 2005/0166810 A1 | 8/2005 | Gnedenko et al. | |
| 2005/0256212 A1 | 11/2005 | Norbeck et al. | |
| 2005/0256592 A1 | 11/2005 | Martens | |
| 2006/0228294 A1 | 10/2006 | Davis et al. | |
| 2007/0006528 A1 | 1/2007 | Diebold et al. | |
| 2007/0045155 A1 | 3/2007 | Selmen et al. | |

FOREIGN PATENT DOCUMENTS

| | | |
|---|---|---|
| CA | 2 349 608 A1 | 5/2000 |
| CA | 2396438 A1 | 7/2003 |
| CA | 2 484 472 A1 | 11/2003 |
| CA | 2 424 805 A1 | 10/2004 |
| CA | 2637779 A1 | 8/2007 |
| CA | 2714911 A1 | 1/2008 |
| CA | 2716912 A1 | 9/2008 |
| CN | 1258712 A | 7/2000 |
| CN | 1382202 A | 11/2002 |
| CN | 1644661 A | 7/2005 |
| DE | 196 52 770 A1 | 6/1998 |
| DE | 199 16 931 A1 | 10/2000 |
| DE | 100 47 787 A1 | 3/2002 |
| EP | 0 153 235 A1 | 8/1985 |
| EP | 0625869 A2 | 11/1994 |
| EP | 0 675 324 A1 | 10/1995 |
| EP | 0 837 041 A1 | 4/1998 |
| EP | 1 136 542 A1 | 9/2001 |
| EP | 1 227 141 A2 | 7/2002 |
| EP | 1 475 429 A1 | 11/2004 |
| EP | 1 696 177 A1 | 8/2006 |
| EP | 1865256 | 12/2007 |
| FR | 2709980 A1 | 3/1995 |
| GB | 2451411 A | 1/2009 |
| JP | 7-111247 B2 | 11/1995 |
| JP | 2003-042429 A | 2/2003 |
| KR | 10-2005-0004647 A | 1/2005 |
| KR | 1020050025290 A | 3/2005 |
| NL | 8200417 | 9/1983 |
| WO | 94/04631 | 3/1994 |
| WO | 01/81828 A1 | 11/2001 |
| WO | 03/018467 A2 | 3/2003 |
| WO | 03/018721 A1 | 3/2003 |
| WO | 2004/072207 A1 | 8/2004 |
| WO | 2004/072210 A1 | 8/2004 |
| WO | 2004/087840 A1 | 10/2004 |
| WO | 2005/047435 A2 | 5/2005 |
| WO | 2006/081661 A1 | 8/2006 |
| WO | 2006/114818 | 11/2006 |
| WO | 2006/128285 A1 | 12/2006 |
| WO | 2006/128286 A1 | 12/2006 |
| WO | 2007/131239 A2 | 11/2007 |
| WO | 2007/131241 A2 | 11/2007 |
| WO | 2009/009891 A1 | 1/2009 |

OTHER PUBLICATIONS

Meeting of the Environmental Advisory Committee, *City of Ottawa Committee Meeting Minutes*, Minutes 27, Ottawa May 11, 2006; http://www.ottawa.ca/calendar/ottawa/citycouncil/a-eac/2006/05-11/minutes27.htm.

Joint Meeting of Corporate Services and Economic Development Committee and Planning and Environmental Committee, *Evaluation Project—Plasma Waste Conversion*, Doc.ACS2005-CMR-OCM-0012; Ottawa, Sep. 7, 2005; http://ottawa.ca/calendar/ottawa/citycouncil/occ/2005/09-28/csedc/ACS2005-CMR-OCM-0012.

Plasco Energy Group. "Plasco Energy", Apr. 2, 2006; http://web.archive.org/web/20060412190747/www.plascoenergygroup.com.

Ontario, Ministry of the Environment, *Certificate of Approval—Air*, No. 6925-6REN9E, Dec. 1, 2006.

Ontario, Ministry of the Environment, *Provisional Certificate of Approval—Waste Disposal Site*, No. 3166-6TYMDZ; Dec. 1, 2006.

U.S. Appl. No. 60/746,632, filed May 5, 2006, Tsangaris.
Klein, "Gasification: An Alternative Process for Energy Receovery and Disposal of Municipal Solid Wastes," May 2002, pp. 1-50.
Physical Chemistry, 2nd edition; Alberty et al., John Wiley & Sons, Inc., p. 157-162, 1996.

Yang et al., "Converting moving-grate incineration from combustion to gasification—Numerical simulation of the burning characteristics," Waste Management, 27(5):645-655, 2007.

* cited by examiner

A

B

GAS REFORMULATING SYSTEM USING PLASMA TORCH HEAT

CROSS REFERENCE TO RELATED APPLICATIONS

This application claims benefit of priority under 35 U.S.C. §119(e) from U.S. Provisional Application Ser. No. 60/798,075, filed May 5, 2006. This application also claims benefit of priority to International Patent Application No. PCT/CA2006/000881, filed Jun. 5, 2006. This application also claims benefit of priority under 35 U.S.C. §119(e) from U.S. Provisional Application Ser. No. 60/864,116, filed Nov. 2, 2006. This application also claims benefit of priority under 35 U.S.C. §119(e) from U.S. Provisional Application Ser. No. 60/911,179, filed Apr. 11, 2007. This application also claims benefit of priority under 35 U.S.C. §119(e) from U.S. Provisional Application Ser. No. 60/797,973, filed May 5, 2006. The contents of all of the aforementioned applications are hereby expressly incorporated by reference in their entirety and for all purposes.

FIELD OF THE INVENTION

This invention pertains to the field of carbonaceous feedstock gasification. In particular, to a gas refining system using plasma torch heat.

BACKGROUND TO THE INVENTION

Gasification is a process that enables the conversion of carbonaceous feedstock, such as municipal solid waste (MSW) or coal, into a combustible gas. The gas can be used to generate electricity, steam or as a basic raw material to produce chemicals and liquid fuels. Possible uses for the gas include: the combustion in a boiler for the production of steam for internal processing and/or other external purposes, or for the generation of electricity through a steam turbine; the combustion directly in a gas turbine or a gas engine for the production of electricity; fuel cells; the production of methanol and other liquid fuels; as a further feedstock for the production of chemicals such as plastics and fertilizers; the extraction of both hydrogen and carbon monoxide as discrete industrial fuel gases; and other industrial applications.

Generally, the gasification process consists of feeding carbonaceous feedstock into a heated chamber (the gasifier) along with a controlled and/or limited amount of oxygen and optionally steam. In contrast to incineration or combustion, which operate with excess oxygen to produce $CO_2$, $H_2O$, $SO_x$, and NOx, gasification processes produce a raw gas composition comprising CO, $H_2$, $H_2S$, and $NH_3$. After clean-up, the primary gasification products of interest are $H_2$ and CO. Useful feedstock can include any municipal waste, waste produced by industrial activity and biomedical waste, sewage, sludge, coal, heavy oils, petroleum coke, heavy refinery residuals, refinery wastes, hydrocarbon contaminated soils, biomass, and agricultural wastes, tires, and other hazardous waste. Depending on the origin of the feedstock, the volatiles may include $H_2O$, $H_2$, $N_2$, $O_2$, $CO_2$, CO, $CH_4$, $H_2S$, $NH_3$, $C_2H_6$, unsaturated hydrocarbons such as acetylenes, olefins, aromatics, tars, hydrocarbon liquids (oils) and char (carbon black and ash).

As the feedstock is heated, water is the first constituent to evolve. As the temperature of the dry feedstock increases, pyrolysis takes place. During pyrolysis the feedstock is thermally decomposed to release tars, phenols, and light volatile hydrocarbon gases while the feedstock is converted to char.

Char comprises the residual solids consisting of organic and inorganic materials. After pyrolysis, the char has a higher concentration of carbon than the dry feedstock and may serve as a source of activated carbon. In gasifiers operating at a high temperature (>1,200° C.) or in systems with a high temperature zone, inorganic mineral matter is fused or vitrified to form a molten glass-like substance called slag.

Since the slag is in a fused, vitrified state, it is usually found to be non-hazardous and may be disposed of in a landfill as a non-hazardous material, or sold as an ore, road-bed, or other construction material. It is becoming less desirable to dispose of waste material by incineration because of the extreme waste of fuel in the heating process and the further waste of disposing, as a residual waste, material that can be converted into a useful syngas and solid material.

The means of accomplishing a gasification process vary in many ways, but rely on four key engineering factors: the atmosphere (level of oxygen or air or steam content) in the gasifier; the design of the gasifier; the internal and external heating means; and the operating temperature for the process. Factors that affect the quality of the product gas include: feedstock composition, preparation and particle size; gasifier heating rate; residence time; the plant configuration including whether it employs a dry or slurry feed system, the feedstock-reactant flow geometry, the design of the dry ash or slag mineral removal system; whether it uses a direct or indirect heat generation and transfer method; and the syngas cleanup system. Gasification is usually carried out at a temperature in the range of about 650° C. to 1200° C., either under vacuum, at atmospheric pressure or at pressures up to about 100 atmospheres.

There are a number of systems that have been proposed for capturing heat produced by the gasification process and utilizing such heat to generate electricity, generally known as combined cycle systems.

The energy in the product gas coupled with substantial amounts of recoverable sensible heat produced by the process and throughout the gasification system can generally produce sufficient electricity to drive the process, thereby alleviating the expense of local electricity consumption. The amount of electrical power that is required to gasify a ton of a carbonaceous feedstock depends directly upon the chemical composition of the feedstock.

If the gas generated in the gasification process comprises a wide variety of volatiles, such as the kind of gas that tends to be generated in a low temperature gasifier with a "low quality" carbonaceous feedstock, it is generally referred to as off-gas. If the characteristics of the feedstock and the conditions in the gasifier generate a gas in which CO and $H_2$ are the predominant chemical species, the gas is referred to as syngas. Some gasification facilities employ technologies to convert the raw off-gas or the raw syngas to a more defined gas composition prior to cooling and cleaning through a gas quality conditioning system.

Utilizing plasma heating technology to gasify a material is a technology that has been used commercially for many years. Plasma is a high temperature luminous gas that is at least partially ionized, and is made up of gas atoms, gas ions, and electrons. Plasma can be produced with any gas in this manner. This gives excellent control over chemical reactions in the plasma as the gas might be neutral (for example, argon, helium, neon), reductive (for example, hydrogen, methane, ammonia, carbon monoxide), or oxidative (for example, oxygen, carbon dioxide). In the bulk phase, a plasma is electrically neutral.

Some gasification systems employ plasma heat to drive the gasification process at a high temperature and/or to refine the offgas/syngas by converting, reconstituting, or reforming longer chain volatiles and tars into smaller molecules with or without the addition of other inputs or reactants. When gaseous molecules come into contact with the plasma heat, they will disassociate into their constituent atoms. Many of these atoms will react with other input molecules to form new molecules, while others may recombine with like atoms. As the temperature of the molecules in contact with the plasma heat decreases all atoms fully recombine. As input gases can be controlled stoichiometrically, output gases can be controlled to, for example, produce substantial levels of carbon monoxide and insubstantial levels of carbon dioxide.

The very high temperatures (3000 to 7000° C.) achievable with plasma heating enable a high temperature gasification process where virtually any input feedstock including waste in as-received condition, including liquids, gases, and solids in any form or combination can be accommodated. The plasma technology can be positioned within a primary gasification chamber to make all the reactions happen simultaneously (high temperature gasification), can be positioned within the system to make them happen sequentially (low temperature gasification with high temperature refinement), or some combination thereof.

The gas produced during the gasification of carbonaceous feedstock is usually very hot but may contain small amounts of unwanted compounds and requires further treatment to convert it into a useable product. Once a carbonaceous material is converted to a gaseous state, undesirable substances such as metals, sulfur compounds and ash may be removed from the gas. For example, dry filtration systems and wet scrubbers are often used to remove particulate matter and acid gases from the gas produced during gasification. A number of gasification systems have been developed which include systems to treat the gas produced during the gasification process.

These factors have been taken into account in the design of various different systems which are described, for example, in U.S. Pat. Nos. 6,686,556, 6,630,113, 6,380,507; 6,215,678, 5,666,891, 5,798,497, 5,756,957, and U.S. Patent Application Nos. 2004/0251241, 2002/0144981. There are also a number of patents relating to different technologies for the gasification of coal for the production of synthesis gases for use in various applications, including U.S. Pat. Nos. 4,141,694; 4,181,504; 4,208,191; 4,410,336; 4,472,172; 4,606,799; 5,331,906; 5,486,269, and 6,200,430.

U.S. Pat. No. 6,810,821 describes an apparatus and method for treating the gas byproduct of a waste treatment system using a plasma torch which employs a working gas including a mixture of carbon dioxide and oxygen and excluding nitrogen. The exclusion of nitrogen is to prevent the formation of nitrogen oxides and hydrogen cyanide which are produced due to the reactions of the nitrogen in the air plasma working gas with oxygen and the hydrocarbons in the vessel/reactor at high temperatures.

U.S. Pat. No. 5,785,923 describes an apparatus for continuous feed material melting which includes an input gas receiving chamber having an input gas torch heater, such as a plasma torch, for destroying the volatile material.

Prior systems and processes have not adequately addressed the problems that must be dealt with on a continuously changing basis. Some of these types of gasification systems describe means for adjusting the process of generating a useful gas from the gasification reaction. Accordingly, it would be a significant advancement in the art to provide a system that can efficiently gasify carbonaceous feedstock in a manner that maximizes the overall efficiency of the process, and/or the steps comprising the overall process.

SUMMARY OF THE INVENTION

An object of the present invention is to provide a gas refining system using plasma torch heat. In accordance with an aspect of the invention, there is provided a system for reformulating of an input gas from a gasification reaction to a reformulated gas of defined chemical composition comprising a refractory-lined cylindrical chamber having a first end and a second end, said chamber comprising an input for receiving the input gas positioned at or near the first end of the chamber; an output for releasing the reformulated gas positioned at or near the second end of the chamber; one or more oxygen source(s) inputs in fluid communication with the chamber; and one or more plasma torches; wherein said plasma torch(es) heat the chamber and the input gas is thereby converted to reformulated gas.

In accordance with another aspect of the invention, there is provided a method for reformulating an input gas from a gasification reaction into a reformulated gas, comprising the steps of delivering the input gas at an inlet of a refractory-lined chamber; injecting an oxygen source into the chamber; torch heating the chamber with one or more plasma torches, and thereby producing the reformulated gas.

This invention provides a gas reformulating system for the reformulating of input gas derived from gasification of carbonaceous feedstock into reformulated gas of a defined chemical composition. In particular, the gas reformulating system uses torch heat from a plasma torch to dissociate the gaseous molecules thereby allowing their recombination into smaller molecules useful for downstream application, such as energy generation. The system may also comprise gas mixing means, process additive means, and a control system with one or more sensors, one or more process effectors and computing means to monitor and/or regulate the reformulating reaction.

BRIEF DESCRIPTION OF THE DRAWINGS

These and other features of the invention will become more apparent in the following detailed description in which reference is made to the appended drawings.

FIG. 6A is a diagram illustrating air-flow within the gas reformulating chamber comprising bridge wall baffles.

DETAILED DESCRIPTION OF THE INVENTION

Figure 1:
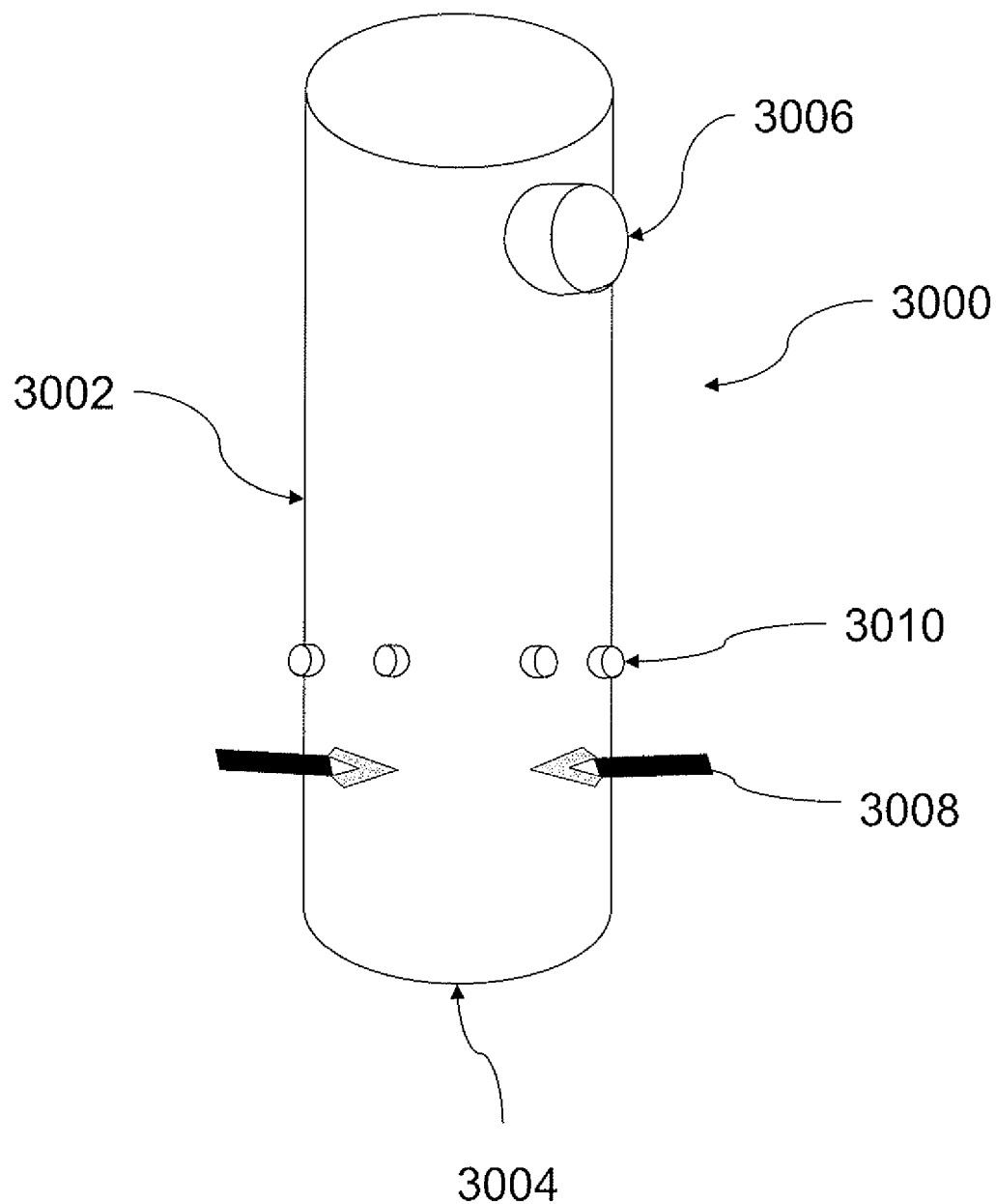
FIG. 1 is a schematic of the gas reformulating system according to an embodiment of the invention.

Unless defined otherwise, all technical and scientific terms used herein have the same meaning as commonly understood by one of ordinary skill in the art to which this invention belongs.

As used herein, the term "sensing element" is defined to describe any element of the system configured to sense a characteristic of a process, a process device, a process input or process output, wherein such characteristic may be represented by a characteristic value useable in monitoring, regulating and/or controlling one or more local, regional and/or global processes of the system. Sensing elements considered within the context of a gasification system may include, but are not limited to, sensors, detectors, monitors, analyzers or any combination thereof for the sensing of process, fluid and/or material temperature, pressure, flow, composition and/or other such characteristics, as well as material position and/or disposition at any given point within the system and any operating characteristic of any process device used within the system. It will be appreciated by the person of ordinary skill in the art that the above examples of sensing elements, though each relevant within the context of a gasification system, may not be specifically relevant within the context of the present disclosure, and as such, elements identified herein as sensing elements should not be limited and/or inappropriately construed in light of these examples.

As used herein, the term "response element" is defined to describe any element of the system configured to respond to a sensed characteristic in order to operate a process device operatively associated therewith in accordance with one or more pre-determined, computed, fixed and/or adjustable control parameters, wherein the one or more control parameters are defined to provide a desired process result. Response elements considered within the context of a gasification system may include, but are not limited to static, pre-set and/or dynamically variable drivers, power sources, and any other element configurable to impart an action, which may be mechanical, electrical, magnetic, pneumatic, hydraulic or a combination thereof, to a device based on one or more control parameters. Process devices considered within the context of a gasification system, and to which one or more response elements may be operatively coupled, may include, but are not limited to, material and/or feedstock input means, heat sources such as plasma heat sources, additive input means, various gas blowers and/or other such gas circulation devices, various gas flow and/or pressure regulators, and other process devices operable to affect any local, regional and/or global process within a gasification system. It will be appreciated by the person of ordinary skill in the art that the above examples of response elements, though each relevant within the context of a gasification system, may not be specifically relevant within the context of the present disclosure, and as such, elements identified herein as response elements should not be limited and/or inappropriately construed in light of these examples.

Overview of the System

Referring to FIG. 1, this invention provides a gas reformulating system (GRS) 3000 comprising a gas reformulating chamber 3002 having one or more input gas inlets 3004, one or more reformulated gas outlets 3006, one or more plasma torches 3008, one or more oxygen source(s) inputs 3010 and a control system.

The invention provides a GRS for converting raw input gas comprising volatile molecules that can include, for example, carbon monoxide, hydrogen, light hydrocarbons, and carbon dioxide and contaminating particulate matter such as soot and carbon black produced during the gasification of carbonaceous feedstock. This GRS provides a sealed environment for containing and controlling the process. It uses plasma torch heat to disassociate the volatile molecules into their constituent elements that then recombine as a reformulated gas of a defined chemical composition. Process additives such as air and/or oxygen and optionally steam are used to provide the necessary molecular species for recombination. The plasma torch heat also removes unwanted substances such as paraffins, tars, chlorinated compounds among others, by decomposing and converting these unwanted substances to smaller molecules such as $H_2$ and CO. The GRS further comprises a control system that regulates the process and thereby enables the process to be optimized.

The GRS is designed to be able to convert the input gas from a gasification reaction into a gas of defined composition, with a chemical makeup comprising smaller molecules in proportion and composition desirable for downstream considerations.

Gas Reformulating System (GRS)

Referring to FIG. 1, the GRS 3000 comprises a gas reformulating chamber 3002 having one or more input gas inlet(s) 3004, one or more reformulated gas outlet(s) 3006, one or more plasma torch(es) 3008, one or more oxygen source(s) input(s) 3010 and a control system.

Downstream of the GRS an induction blower in gaseous communication with the gas reformulating chamber may be provided to maintain the pressure of the gas reformulating chamber at a desired pressure, for example a pressure of about 0 to −5 mbar.

Figure 2:
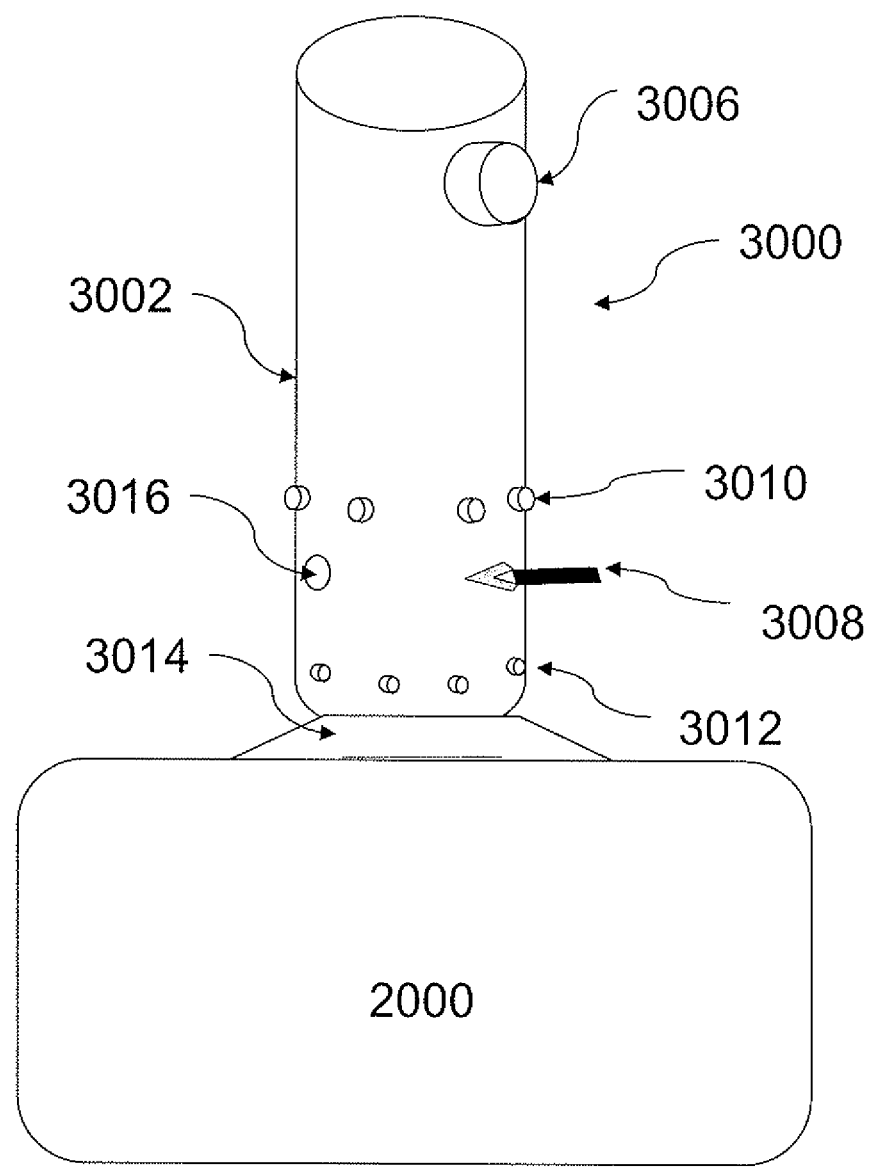
FIG. 2 is a schematic of one embodiment of a gas reformulating system of the invention coupled to a gasifier.

Referring to FIG. 2, in one embodiment, the GRS 3000 is designed to be coupled directly to a gasifier 2000 such that the gas reformulating chamber 3002 is in gaseous communication with the gasifier 2000. The gas reformulating chamber 3002 therefore receives input gas directly from the gasifier 2000. In such embodiments, the GRS 3000 may further comprise a mounting flange 3014 or connector for coupling the gas reformulating chamber 3002 to the gasifier 2000. To facilitate maintenance or repair, the GRS 3000 may optionally be reversibly coupled to the gasifier 2000 such that the GRS 3000, if necessary, may be removed.

Figure 3:
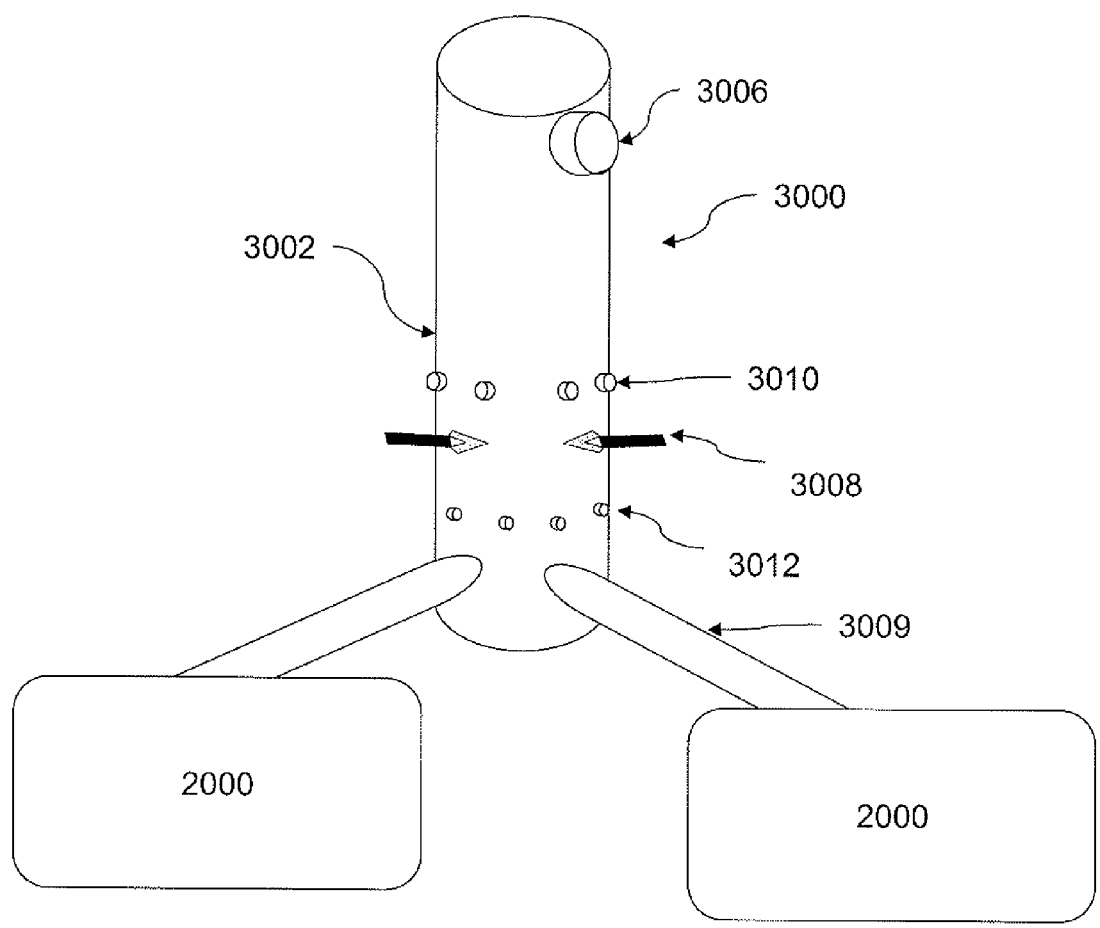
FIG. 3 is a schematic of one embodiment of a gas reformulating system of the invention coupled to two gasifiers.
Figure 4:
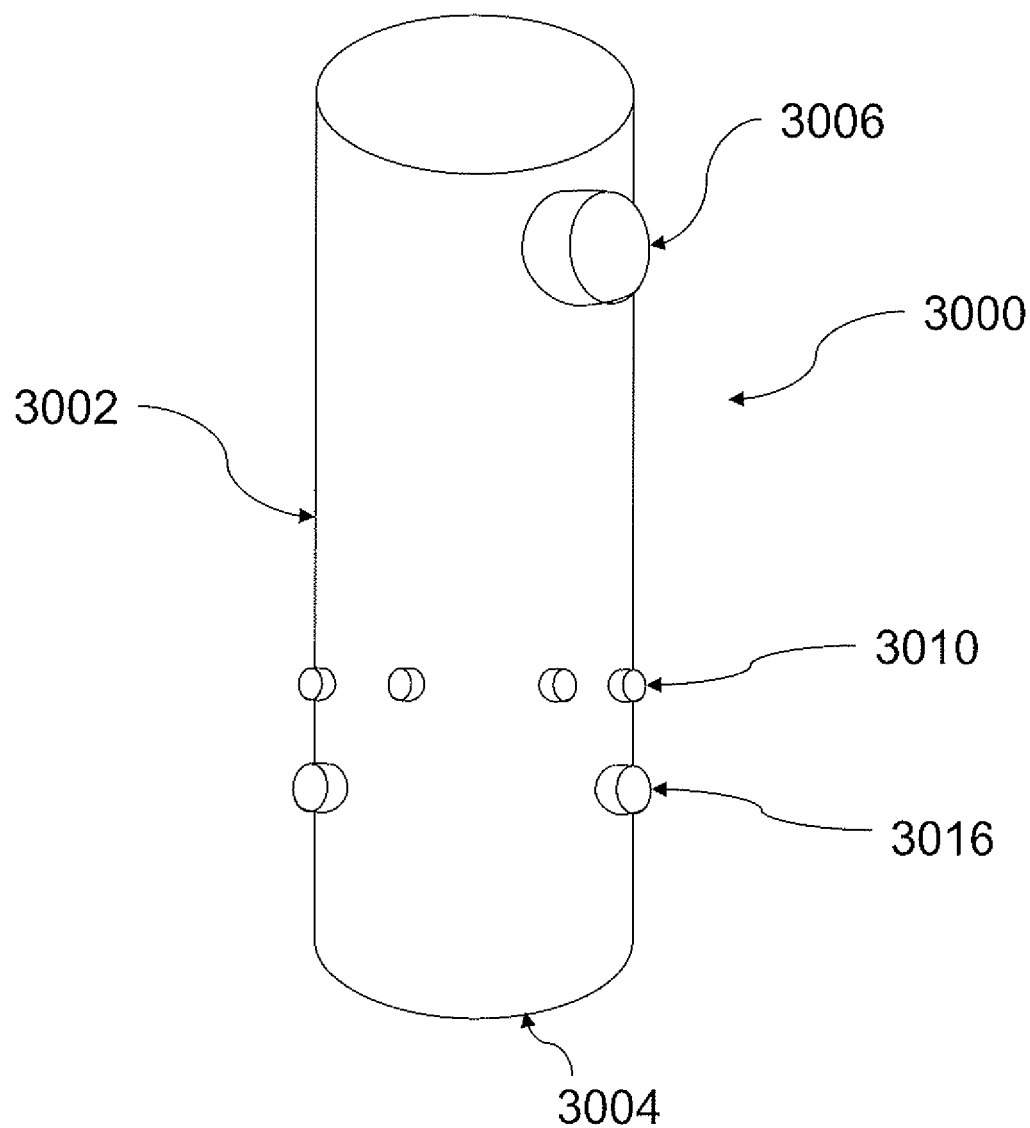
FIG. 4 is a schematic of a gas reformulating chamber according to an embodiment of the invention.

In one embodiment as demonstrated by FIG. 3, the GRS 3000 is a stand-alone unit which receives input gas from one or more storage tank(s) or one or more gasifier(s) 2000 via piping 3009 or appropriate conduits. In such stand-alone units, the GRS may further comprise appropriate support structures.

The Gas Reformulating Chamber

Referring to FIGS. 1 to 4, the gas reformulating chamber 3002 has one or more input gas inlets 3004, one or more reformulated gas outlets 3006, one or more ports for heaters 3016 and one or more ports for oxygen source(s) inputs.

Input gas enters the plasma-torch heated gas reformulating chamber 3002 through one or more input gas inlet(s) 3004 in the chamber 3002 and is optionally blended by gas mixers 3012. One or more input(s) 3010 are provided through which the oxygen source(s) are injected into the gas reformulating chamber 3002. The one or more reformulated gas outlets 3006 enable the reformulated gas to exit the GRS 3000 and to be passed to downstream processes, for example for further refinement or for storage at storage facilities.

Design Objectives

The gas reformulating chamber 3002 is a chamber with a sufficient internal volume to accommodate the residence time required for the reformulating of input gas into reformulated gas to occur.

Accordingly, in designing the gas reformulating chamber, the required gas residence time can be considered. Gas residence time is a function of the gas reformulating chamber volume and geometry, gas flow rate, the distance the gas travels and/or the path of the gas through the chamber (i.e., a straight linear passage or a swirling, cyclonic, helical or other non-linear path). The gas reformulating chamber must, therefore, be shaped and sized in such a manner that the flow dynamics of the gas through the chamber allows for an adequate gas residence time. The gas residence time can be modified by the use of air jets that promote a swirling flow of the gas through the gas reformulating chamber, such that the passage of the gas is non-linear and therefore has a longer residence time.

In one embodiment, the gas residence time is about 0.5 to about 2.0 seconds. In one embodiment, the gas residence time is about 0.75 to about 1.5 seconds. In a further embodiment, the gas residence time is about 1 to about 1.25 seconds. In a still further embodiment, the gas residence time is about 1.2 seconds.

Flow modeling of the GRS can be performed to ensure that a particular design of a gas reformulating chamber promotes proper mixing of process inputs, and proper conditions formation to enable the required chemical reformulatings to occur.

Shape and Orientation

The gas reformulating chamber 3002 may be any shape so long as it allows for the appropriate residence time to enable sufficient reformulating of the input gas into reformulated gas. The gas reformulating chamber 3002 may be disposed in a variety of positions so long as appropriate mixing of the input gas occurs and a desired residence time is maintained.

The gas reformulating chamber can be oriented substantially vertically, substantially horizontally or angularly and have a wide range of length-to-diameter ratios ranging from about 2:1 to about 6:1. In one embodiment, the length-to-diameter ratio of the gas reformulating chamber 3002 is 3:1.

In one embodiment, the gas reformulating chamber 3002 is a straight tubular or venturi shaped structure comprising a first (upstream) end and a second (downstream) end and is oriented in a substantially vertical position or a substantially horizontal position.

In one embodiment, the gas reformulating chamber 3002 is positioned substantially horizontally or substantially vertically, has a volume designed to allow a sufficient gas residence time to complete the cracking of hydrocarbon organic compounds in the input gas, and a length/diameter ratio designed to ensure the gas velocity is in the optimization range.

Figure 5:
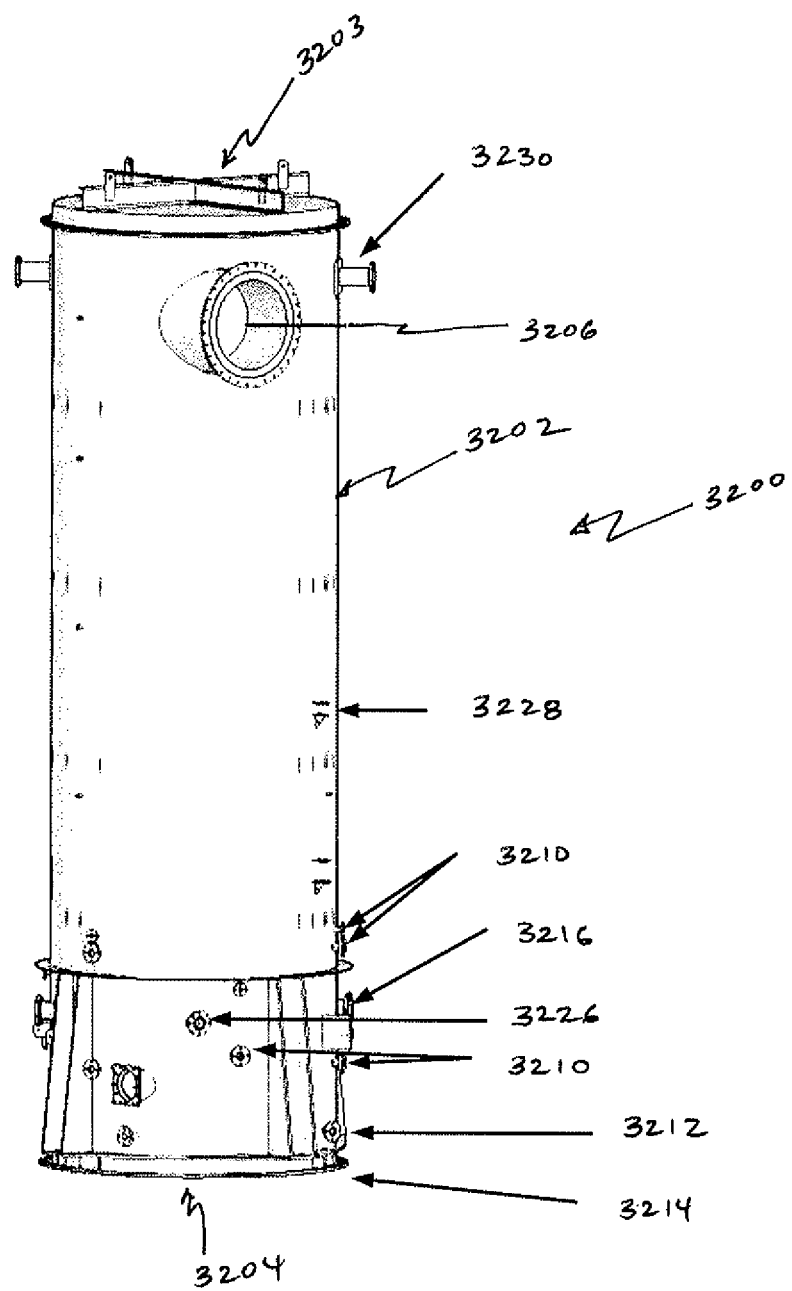
FIG. 5 is a schematic of one embodiment of the gas reformulating chamber.

In one embodiment as depicted in FIG. 5 in which the GRS 3202 is configured for coupling to a gasifier, the gas reformulating chamber 3202 is a straight, substantially, vertical refractory-lined capped cylindrical structure having an open bottom (upstream) end 3204 for direct gaseous communication with a gasifier 2000 and one reformulated gas outlet 3206 proximal to or at the top (downstream) end of the chamber. The cylindrical chamber is formed by capping the top (downstream) end of a refractory-lined cylinder with a refractory-lined lid 3203. In order to facilitate maintenance or repair, the lid is removeably sealed to the cylinder.

The wall of the gas reformulating chamber can be lined with refractory material and/or a water jacket can encapsulate the gas reformulating chamber for cooling and/or generation of steam or recovery of usable torch heat.

The gas reformulating chamber may have multiple walls, along with a cooling mechanism for heat recovery, and the gas reformulating system may also include heat exchangers for high pressure/high temperature steam production, or other heat recovery capability.

Optionally, the gas reformulating chamber can include one or more chambers, can be vertically or horizontally oriented, and can have internal components, such as baffles, to promote back mixing and turbulence of the gas.

The gas reformulating chamber may optionally have a collector for solid particulate matter that can be collected and optionally fed into the gasifier for further processing or the solid residue compartments of a gasification system, such as a solid residue conditioning chamber, for further processing.

Collectors for solid particulate matter are known in the art and include but not limited to centrifugal separators, inertial impingement baffles, filters or the like.

In embodiments in which the GRS is directly coupled to the gasifier additional solid particulate collectors may not be necessary as particulates formed may, in part, fall directly back into the gasifier.

The temperature of the reformulated gas exiting the GRS 3000 will range from about 400° C. to over 1000° C. The temperature may be optionally reduced by a downstream heat exchange system used to recover heat and cool the reformulated gas. If necessitated by downstream applications or components, the exit temperature of the reformulated gas can be reduced by recirculating cooled reformulated gas at the top of the gas reformulating chamber 3002 such that the cooled reformulated gas and the newly produced reformulated gas mix. The gas reformulating chamber 3002 therefore can optionally include inlets proximal to the downstream end of the chamber for injecting cooled reformulated gas into the newly formed hot reformulated gas.

Materials

The gas reformulating chamber is generally a refractory-lined chamber with an internal volume sized to accommodate the appropriate amount of gas for the required gas residence time or otherwise fabricated so that it is able to withstand high temperatures.

Conventional refractory materials that are suitable for use in a high temperature (e.g. up to about 1200° C.), un-pressurized chamber are well-known to those skilled in the art. Examples of suitable refractory materials include, but are not limited to, high temperature fired ceramics, i.e., aluminum oxide, aluminum nitride, aluminum silicate boron nitride, zirconium phosphate, glass ceramics and high alumina brick containing principally, silica, alumina, chromia and titania, ceramic blanket and insulating firebrick. Where a more robust refractory material is required, materials such as Didier Didoflo 89CR and Radex Compacflo V253 may be used.

In one embodiment, the refractory can be a multilayer design with a high density layer on the inside to resist the high temperature, erosion and corrosion that is present in the gas reformulating chamber. Outside the high density material is a lower density material with lower resistance properties but higher insulation factor. Optionally, outside this layer is a very low density foam board material with very high insulation factor that can be used because it will not be exposed to a corrosive environment which can exist within the gas reformulating chamber. The multilayer design can further optionally comprise an outside layer, between the foam board and the vessel shell that is a ceramic blanket material to provide a compliant layer to allow for differential expansion between the solid refractory and the vessel shell. Appropriate materials for use in a multilayer refractory are well known in the art.

In one embodiment, the multilayer refractory can further comprise segments of compressible refractory separating sections of a non-compressible refractory to allow for vertical expansion of the refractory. The compressible layer can optionally be protected from erosion by overlapping extendible high density refractory.

In one embodiment, the multilayer refractory can comprise an internally oriented chromia layer; a middle alumina layer and an outer insboard layer.

In some embodiments of the invention, the gas reformulating chamber includes a layer of up to about seventeen inches, or more, of specially selected refractory lining throughout the entire gas reformulating chamber to ensure maximum retention of processing torch heat while being impervious to chemical reaction from the intermediate chemical constituents formed during processing.

The refractory lining in the bottom section of the gas reformulating chamber can be more prone to wear and deterioration since it must withstand higher temperatures from the operating sources of plasma torch heat. In one embodiment, therefore, the refractory in the lower section is designed to comprise a more durable "hot face" refractory than the refractory on the gas reformulating chamber walls and top. For example, the refractory on the walls and top can be made of DIDIER RK30 brick, and the different "hot face" refractory for the lower section can be made with RADEX COMPACFLO V253.

In embodiments in which the gas reformulating chamber is refractory-lined, the wall of the gas reformulating chamber can optionally incorporate supports for the refractory lining or refractory anchors.

Gas Inlets and Outlets

The gas reformulating chamber 3002 comprises one or more input gas inlets 3004 to feed input gas into the chamber for processing and one or more reformulated gas outlets or ports 3006 to pass the reformulated gas produced in the reformulating reactions to downstream processing or storage. The inlet(s) for input gas is located at or near the first or upstream end. The inlet may comprise an opening or, alternatively, may comprise a device to control the flow of input gas into the gas reformulating chamber and/or a device to inject the input gas into the gas reformulating chamber.

In one embodiment, the one or more input gas inlets 3004 for delivering the input gas to the gas reformulating chamber can be incorporated in a manner to promote concurrent, countercurrent, radial, tangential, or other feed flow directions.

In one embodiment, there is provided a single input gas inlet with an increasing conical shape.

In one embodiment, the inlet comprises the open first end of the gas reformulating chamber, whereby it is in direct gaseous communication with the gasifier.

In embodiments in which the gasifier and GRS are directly coupled, the attachment site on the gasifier for coupling to the GRS may be strategically located to optimize gas flow and/or maximize mixing of the input gas prior to entering the gas reformulating chamber.

In one embodiment, the gas reformulating chamber is located at the center of the gasifier, thereby optimizing mixing of the input gas prior to entering the gas reformulating chamber.

In one embodiment, the inlet comprises an opening located in the closed first (upstream) end of the gas reformulating chamber. This embodiment uses an input gas inlet port to deliver the volatiles generated during gasification of carbonaceous feedstock into the chamber.

In one embodiment, the inlet comprises one or more openings in the wall of the gas reformulating chamber proximal to the first (upstream) end.

Referring to FIG. 3, in embodiments in which the gas reformulating chamber 3000 is connected to one or more gasifiers 2000, one or more inlets in the gas reformulating chamber 3002 may be in direct communication with the one or more gasifier 2000 through a common opening or may be connected to the gasifier 2000 via piping 3009 or via appropriate conduits.

The reformulated gas produced in the reformulating reaction exits the gas reformulating chamber through one or more reformulated gas outlets 3006.

One or more outlets 3006 for the reformulated gas produced in the gas reformulating chamber are located at or near the second or downstream end. The outlet may comprise an opening or, alternatively, may comprise a device to control the flow of the reformulated gas out of the gas reformulating chamber.

In one embodiment, the outlet comprises the open second (downstream) end of the gas reformulating chamber.

In one embodiment, the outlet comprises one or more openings located in the closed second (downstream) end of the gas reformulating chamber.

In one embodiment, the outlet comprises an opening in the wall of the gas reformulating chamber near the second (downstream) end.

Ports

The gas reformulating chamber comprises various ports including one or more ports for heaters, one or more process additive ports, and optionally one or more access ports, view ports and/or instrumentation ports.

Heater ports include ports for primary heat sources including plasma torches and optional secondary sources.

In one embodiment, the gas reformulating chamber comprises one or more port(s) for mounting plasma torches 3016.

In one embodiment, the gas reformulating chamber 3002 comprises two or more ports for mounting plasma torches 3016.

In one embodiment, the gas reformulating chamber comprises three or more ports for mounting plasma torches.

In one embodiment, the gas reformulating chamber comprises four or more ports for mounting plasma torches.

In one embodiment, there is provided two ports for plasma torches positioned at diametric locations along the circumference of the gas reformulating chamber.

In one embodiment, two ports are provided for tangentially mounting two plasma torches.

In one embodiment, the ports for the tangentially mounted plasma torches are located above the air inlets to provide maximum exposure to plasma torch heat.

Optionally, ports for mounting plasma torches may be fitted with a sliding mounting mechanism to facilitate the insertion and removal of the plasma torch(es) from the gas reformulating chamber and may include an automatic gate valve for sealing the port following retraction of the plasma torch(es).

Optionally, one or more process additive port(s) or inlet(s) are included to enable process additives, such as carbon dioxide, other hydrocarbons or additional gases to be injected into the gas reformulating chamber. Optionally, ports or inlets are provided such that reformulated gas not meeting quality standards may be re-circulated into the gas reformulating chamber for further processing. Ports or inlets may be located at various angles and/or locations to promote turbulent mixing of the materials within the gas reformulating chamber.

One or more ports can be included to allow measurements of process temperatures, pressures, gas composition and other conditions of interest.

In addition, the gas reformulating chamber 3002 may further include one or more ports for secondary torch heat sources to assist in the pre-heating or torch heating of the gas reformulating chamber.

Optionally, plugs, covers, valves and/or gates are provided to seal one or more of the ports or inlets in the gas reformulating chamber 3002. Appropriate plugs, covers, valves and/or gates are known in the art and can include those that are manually operated or automatic. The ports may further include appropriate seals such as sealing glands.

Oxygen Source(s) Ports

As noted above, the GRS comprises one or more inputs for oxygen source(s), the oxygen source(s) includes oxygen, oxygen-enriched air, air, oxidizing medium, steam and other oxygen sources as would be readily understood. Thus the gas conversion chamber comprises one or more ports for oxygen source(s) inputs.

In one embodiment, the gas reformulating chamber comprises one or more port(s) for air and/or oxygen inputs and optionally one or more ports for steam inputs.

In one embodiment, the gas reformulating chamber 3002 comprises one or more oxygen source(s) port(s). In one embodiment, the gas reformulating chamber comprises two or more oxygen source(s) ports. In one embodiment, the gas reformulating chamber comprises four or more oxygen source(s) ports. In one embodiment, the gas reformulating chamber comprises six oxygen source(s) ports. In one embodiment, there is provided nine oxygen source(s) ports arranged in three layers around the circumference of the gas reformulating chamber. The oxygen source(s) ports may be in various arrangements so long as the arrangements provide sufficient mixing of the oxygen source(s) with the input gas.

Gas Mixers

The gas reformulating chamber 3002 may further optionally include one or more additional or supplementary gas mixers at or near the input gas inlet to mix the input gas such that the input gas is of more uniform composition and/or temperature and/or to mix the input gas with process additives or oxygen source(s). The mixers may include one or more air jets (air swirl jets) at or near the input gas inlet which inject a small amount of air into the input gas and create a swirling motion or turbulence in the input gas stream and thereby mix the input gas.

In one embodiment, the mixer comprises two or more air swirl jets at or near the input gas inlet which inject a small amount of air into the input gas and create a swirling motion or turbulence in the input gas stream and thereby mix the input gas by taking advantage of the injected air's velocity.

In one embodiment, the mixer comprises three or more air swirl jets at or near the inlet which inject a small amount of air into the input gas and create a swirling motion or turbulence in the input gas stream and thereby mix the input gas.

In one embodiment, the mixer comprises four or more air swirl jets at or near the inlet which inject a small amount of air into the input gas and create a swirling motion or turbulence in the input gas stream and thereby mix the input gas. The number of air swirl jets can be designed to provide substantially maximum mixing and swirl based on the designed air flow and exit velocity, so that the jet could penetrate to the center of the chamber.

Baffles may also be used to induce mixing of the input gas by creating turbulence in the input gas. A baffle is a mechanical obstruction to the normal flow pattern. Baffles serve to block a section of the gas reformulation chamber cross section, resulting in a rapid increase in flow velocity and a corresponding rapid decrease on the downstream side of the baffle. This generates a high level of turbulence and speeds local mixing.

Figure 6:
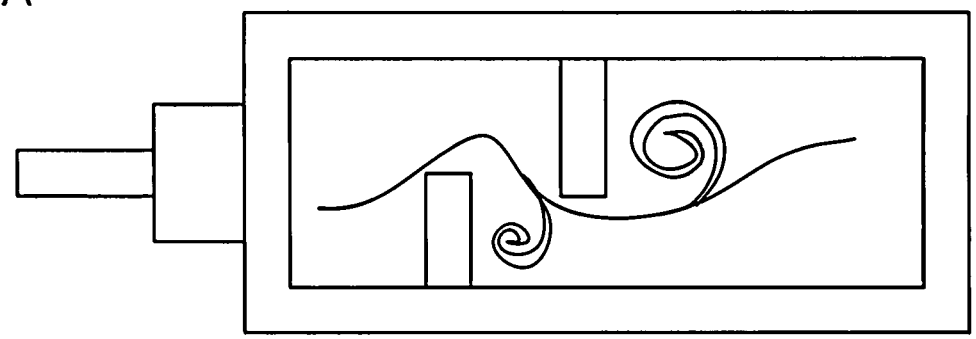
FIGS. 6A and B illustrates an arrangement of baffles in one embodiment of the gas reformulating chamber.
FIG. 6B is a diagram illustrating air-flow within the gas reformulating chamber comprising turbulator or choke ring baffles.
Figure 6:
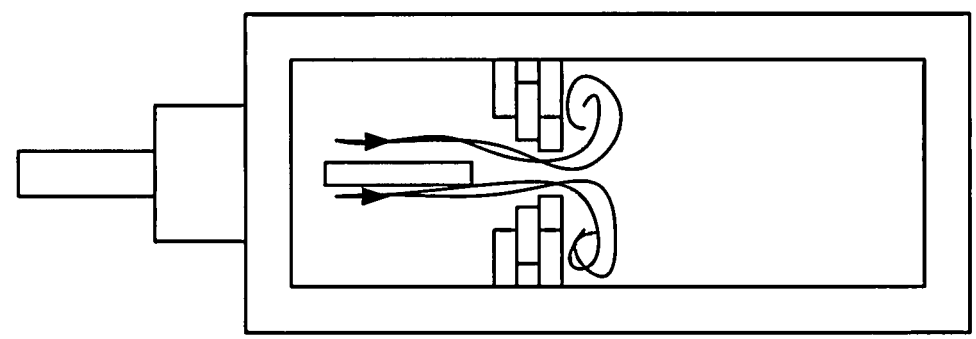

Baffles may be located at various locations in the gas reformulating chamber. Baffle arrangements are known in the art and, include but are not limited, to cross bar baffles, bridge wall baffles (FIG. 6A), choke ring baffle (FIG. 6B) arrangements and the like. Accordingly, in one embodiment, the gas mixer comprises baffles.

Oxygen Source(s)

As noted above, the GRS comprises one or more oxygen source(s) inputs, the oxygen source(s) can include but not limited to oxygen, oxygen-enriched air, air, oxidizing medium and steam.

In one embodiment, the one or more oxygen source(s) input(s) comprise one or more air and/or oxygen and optionally one or more steam input(s).

Figure 7:
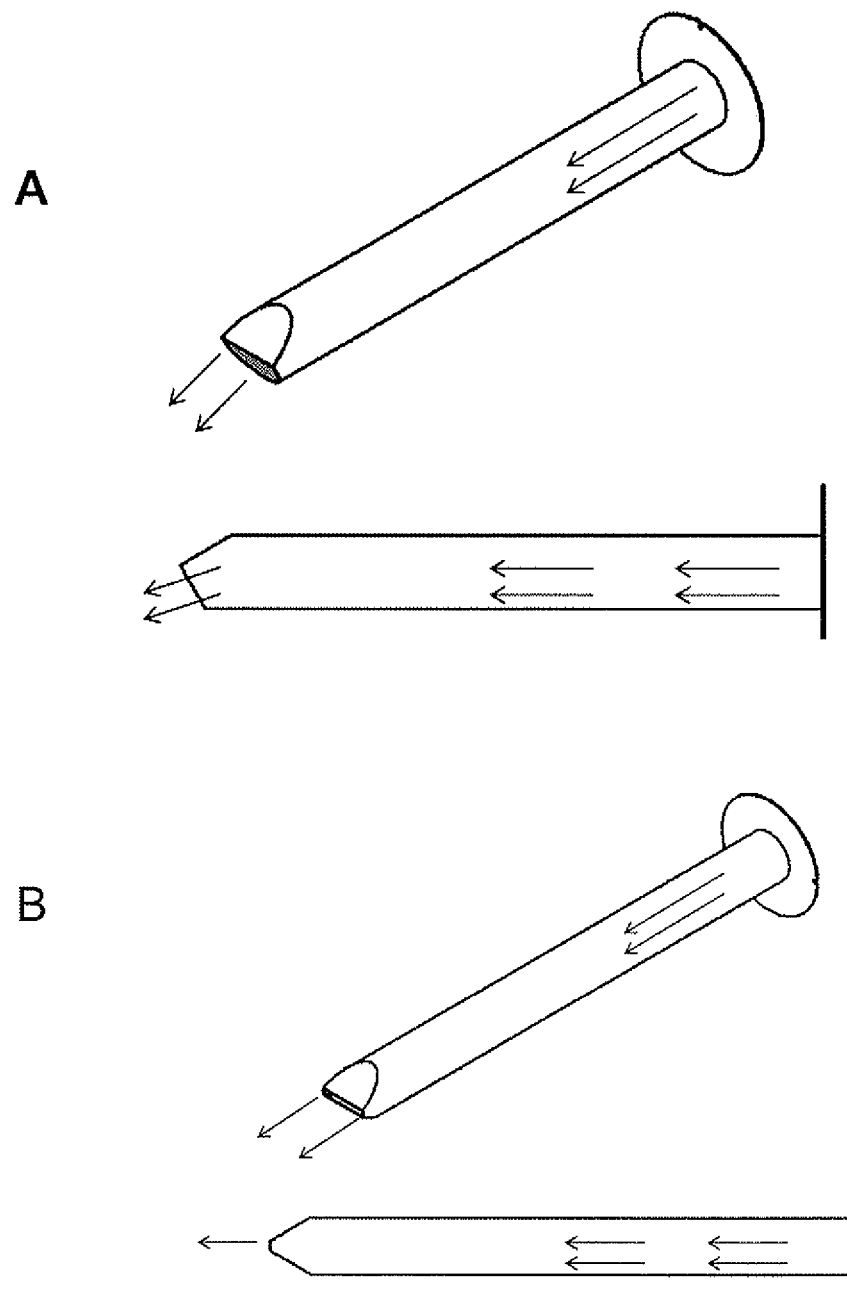
FIG. 7A is a diagram illustrating air-flow out of a Type A nozzle.
FIG. 7B is a diagram illustrating air-flow out of a Type B nozzle.
Figure 8:
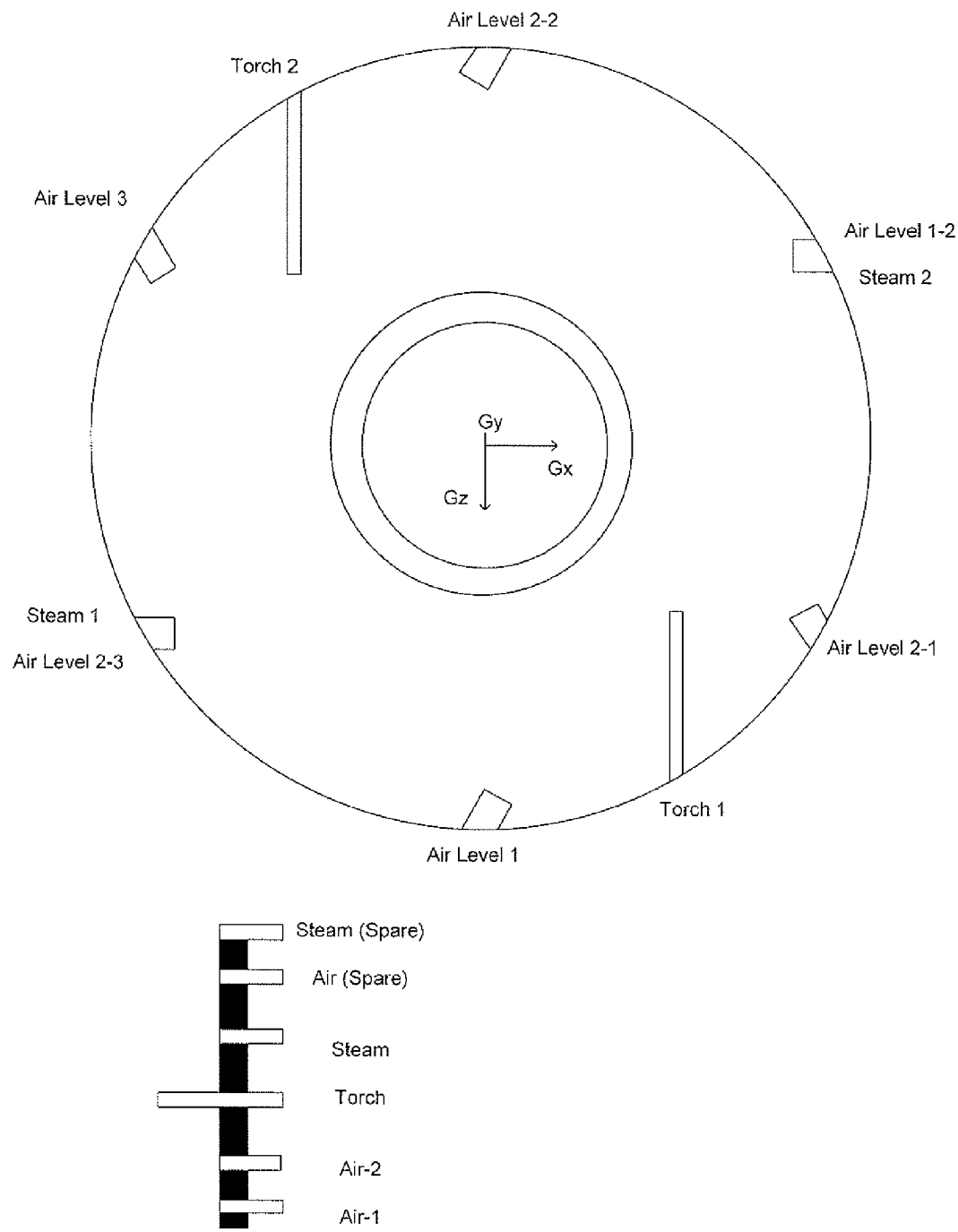
FIG. 8 is a schematic illustrating the orientation of the inlets and plasma torch ports of one embodiment.
Figure 9A:
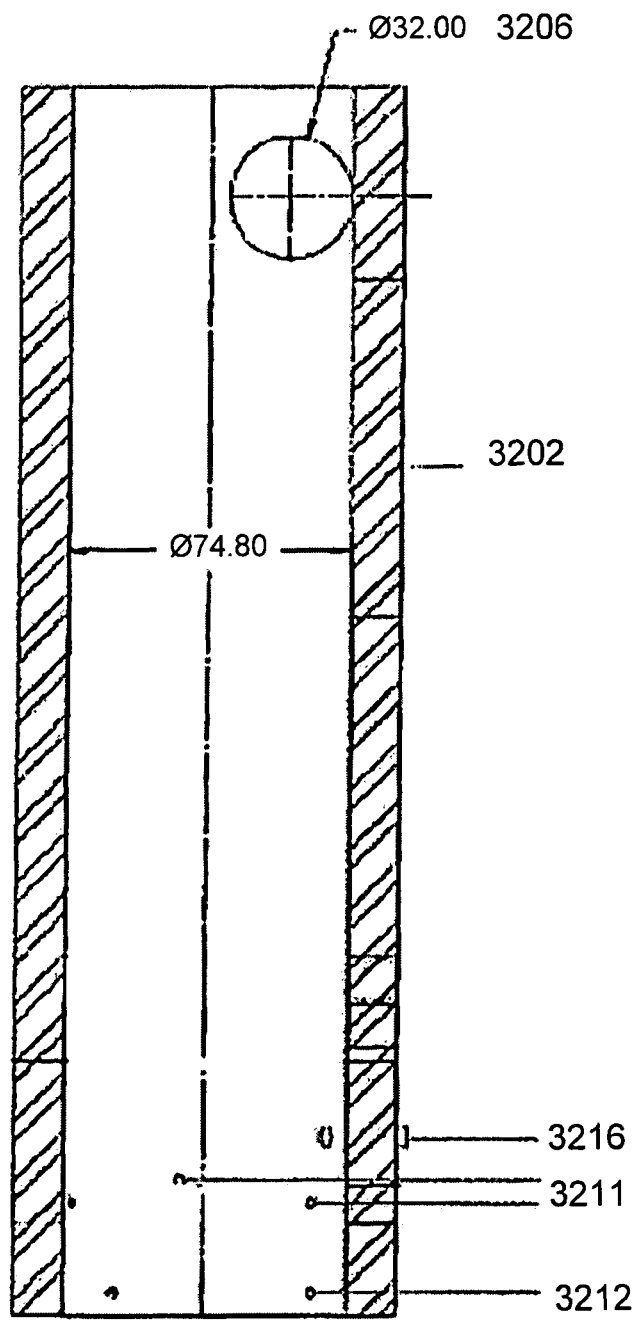
FIG. 9A is a cross-sectional view of the gas reformulating chamber of FIG. 5.
Figure 9B:
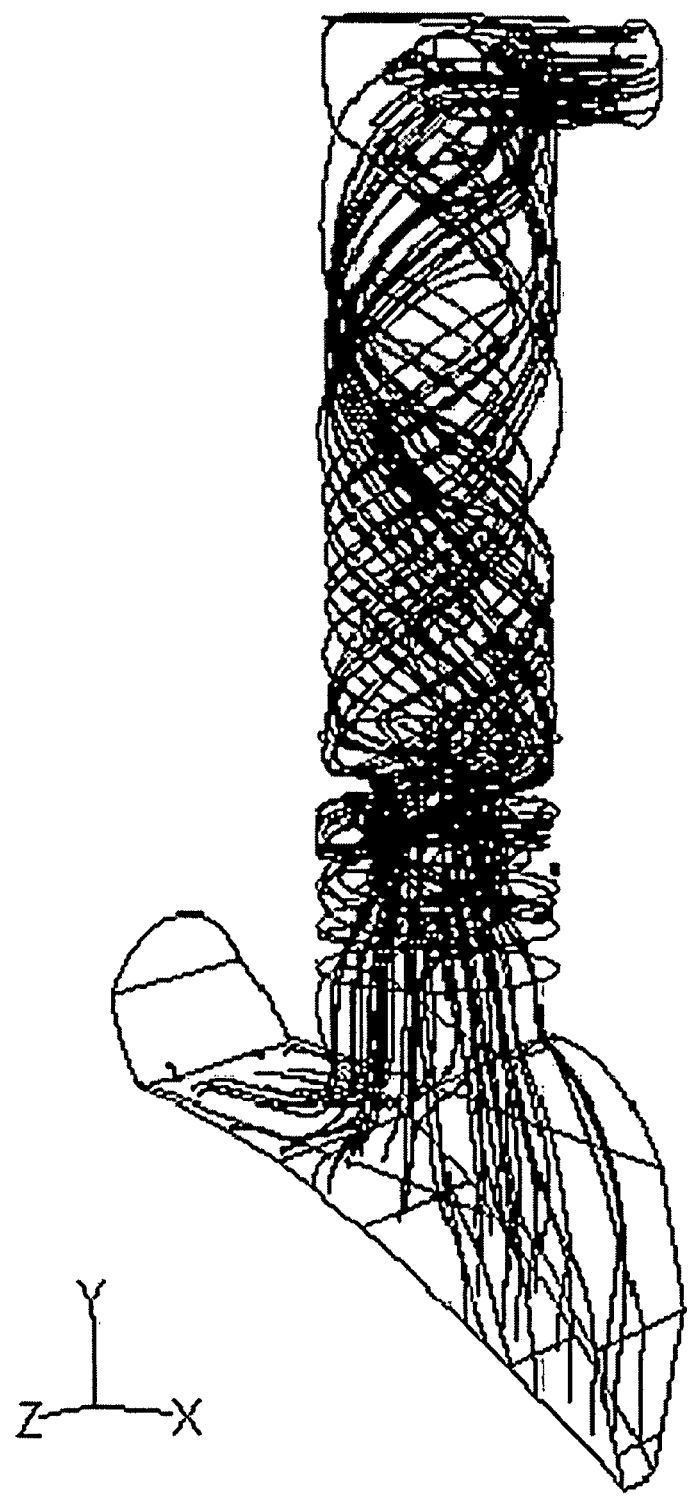
FIG. 9B is a diagram illustrating the air-flow within a gasifier comprising a gas reformulating system of the invention including the gas reformulating chamber of FIG. 5.
Figure 9C:
FIG. 9C illustrates the injection of air from the air inputs into the chamber and its effect on air-flow in the chamber of FIG. 5.
Figure 9C:
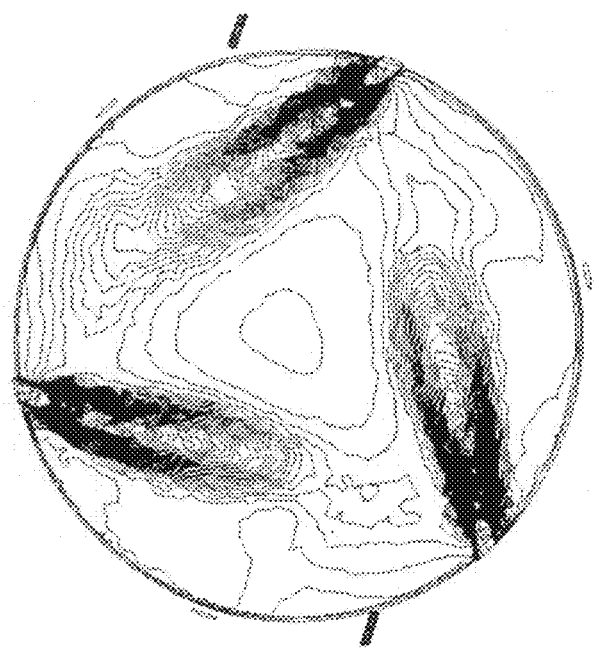

In one embodiment, the air and/or oxygen and steam inputs comprise high temperature resistance atomizing nozzles or jets. Appropriate air nozzles are known in the art and can include commercially available types. A single type of nozzle or multiple different types of nozzles may be used in the GRS. Example nozzles include type A nozzles and type B nozzles as illustrated in FIG. 7. The type of nozzles can be chosen based on functional requirements, for example a type A nozzle is for changing the direction of air flows for creating the desired swirls and a type B nozzle is for creating high velocity of air flow to achieve certain penetrations, and maximum mixing.

The nozzles can direct the air to a desired angle which is effective for mixing the gas. In one embodiment, the air jets are positioned tangentially. In one embodiment, angular blowing is achieved by having a deflector at the tip of the input nozzle, thus allowing the inlet pipes and flanges to be square with the gas reformulating chamber.

The arrangement of air and/or oxygen inputs is based on the diameter of the gas reformulating chamber, the designed flow and jet velocity, so that adequate penetration, substantially maximum swirl and mixing can be achieved. Various arrangements of the oxygen inputs or ports, steam inputs or ports and ports for plasma torches which provide sufficient mixing of the input gas with the injected oxygen and steam and sufficient residence time for the reformulating reaction to occur are contemplated by the invention. For example, the oxygen inputs or ports, steam inputs or ports and ports for the plasma torches may be arranged in layers around the circumference of the gas reformulating chamber. This arrangement allows for the tangential and layered injection of plasma gases, oxygen and steam which results in a swirling motion and adequate mixing of the input gas with the oxygen and steam and provides a sufficient residence time for the reformulating reaction to occur.

In embodiments in which the air and/or oxygen input ports are arranged in layers, the air and/or oxygen input ports can optionally be arranged to substantially maximize the mixing effects.

In one embodiment, all the air and/or oxygen input ports are positioned tangentially thereby allowing the lower level input ports to premix the gas, torch heat it up, and start a swirl motion in the gas. The upper level air input ports cab accelerate the swirl motion thereby allowing a re-circulating vortex pattern to be developed and persisted.

Referring to FIG. 9, in one embodiment, the lowest level of air input ports is composed of four jets, 3212, which will premix the gases generated from a lower gasifier, torch heat it up. The other upper two levels of air nozzles, 3211, will provide main momentum and oxygen to mix gases and torch heat up to the temperature required.

The arrangements of steam inputs or ports is flexible in number, levels, orientations and angle as long as they are located in a position to provide optimized capabilities to temperature control.

In one embodiment, the gas reformulating chamber comprises one or more steam inputs or ports. In one embodiment, the gas reformulating chamber comprises two or more steam inputs or ports. The steam inputs or ports may be in various arrangements so long as the arrangements provide sufficient mixing with the input gas. In one embodiment there is provided two steam input ports arranged in two layers around the circumference of the gas reformulating chamber and positioned at diametric locations.

The oxygen and/or steam input ports may also be positioned such that they inject oxygen and steam into the gas reformulating chamber at an angle to the interior wall of the gas reformulating chamber which promotes turbulence or a swirling of the gases. The angle is chosen to achieve enough jet penetration and maximum mixing based on chamber diameter and designed air input port flow and velocity.

In one embodiment, the oxygen and/or steam inputs inject air and steam at an angle between about 50-70° from the interior wall of the gas reformulating chamber. In one embodiment, the oxygen and steam inputs inject air and steam at an angle between about 55-65° from the interior wall of the gas reformulating chamber. In one embodiment, the oxygen and steam inputs inject oxygen and steam at an about 60° angle from the interior wall of the gas reformulating chamber.

In one embodiment, the air input ports can be arranged such that they are all in the same plane, or they can be arranged in sequential planes. The arrangement of air input ports is designed to achieve maximum mixing effects. In one embodiment the air input ports are arranged in lower and upper levels. In one embodiment, there are four air input ports at the lower level and another six air input ports at upper level in which three input ports are slightly higher than the other three to create cross-jet mixing effects to achieve better mixing.

In one embodiment, the gas reformulating chamber includes oxygen inputs, steam input ports, and ports for plasma torches that are arranged such that there is adequate mixing of the gases and steam throughout the chamber.

Optionally, air can be blown into the chamber angularly so that the air creates a rotation or cyclonic movement of the gases passing through the chamber. The plasma torches may also be angled to provide further rotation of the stream.

Plasma Torches and Secondary Torch Heat Sources

In order for the reformulating reaction to occur, the gas reformulating chamber 3002 must be torch heated to a sufficiently high temperature. A worker skilled in the art could readily determine an adequate temperature for the reformulating reaction. In one embodiment, the temperature is about 800° C. to about 1200° C. In one embodiment, the temperature is about 950° C. to about 1050° C. In one embodiment the temperature is about 1000° C. to 1200° C.

The GRS therefore further comprises one or more non-transferred arc plasma torches 3008. Non-transferred arc plasma torches are known in the art and include non-transferred arc A.C. and D.C. plasma torches. A variety of gases have been used with plasma torches including but not limited to air, $O_2$, $N_2$, Ar, $CH_4$, $C_2H_2$ and $C_3H_6$. A worker skilled in the art could readily determine the type of plasma torches that may be used in the GRS.

In one embodiment, the plasma torch is one or more non-transferred arc A.C. plasma torch(es). In one embodiment, the plasma torch is one or more non-transferred D.C. plasma torch(es). In one embodiment, the plasma torch is two non-transferred, reverse polarity D.C. plasma torches.

In one embodiment, there are two plasma torches that are positioned tangentially to create same swirl directions as air and/or oxygen inputs do. In one embodiment, the plasma torch is two 300 kW plasma torches each operating at the (partial) capacity required.

In one embodiment, the gas reformulating system comprises one or more plasma torch(es). In one embodiment, the gas reformulating system comprises two or more plasma torches. In one embodiment, the gas reformulating system comprises two water cooled, copper electrode, NTAT DC plasma torches.

In one embodiment, the use of plasma torch heat is minimized by maximizing the release of torch heat that occurs during the reformulating of carbon or multi-carbon molecules to mainly CO and $H_2$ by optimizing the amount of air and/or oxygen injected into the gas reformulating chamber.

The Control System

In one embodiment of the present invention, a control system may be provided to control one or more processes implemented in, and/or by, the various systems and/or subsystems disclosed herein, and/or provide control of one or more process devices contemplated herein for affecting such processes. In general, the control system may operatively control various local and/or regional processes related to a given system, subsystem or component thereof, and/or related to one or more global processes implemented within a system, such as a gasification system, within or in cooperation with which the various embodiments of the present invention may be operated, and thereby adjusts various control parameters thereof adapted to affect these processes for a defined result. Various sensing elements and response elements may therefore be distributed throughout the controlled system(s), or in relation to one or more components thereof, and used to acquire various process, reactant and/or product characteristics, compare these characteristics to suitable ranges of such characteristics conducive to achieving the desired result, and respond by implementing changes in one or more of the ongoing processes via one or more controllable process devices.

The control system generally comprises, for example, one or more sensing elements for sensing one or more characteristics related to the system(s), process(es) implemented therein, input(s) provided therefor, and/or output(s) generated thereby. One or more computing platforms are communicatively linked to these sensing elements for accessing a characteristic value representative of the sensed characteristic(s), and configured to compare the characteristic value(s) with a predetermined range of such values defined to characterize these characteristics as suitable for selected operational and/or downstream results, and compute one or more process control parameters conducive to maintaining the characteristic value with this predetermined range. A plurality of response elements may thus be operatively linked to one or more process devices operable to affect the system, process, input and/or output and thereby adjust the sensed characteristic, and communicatively linked to the computing platform(s) for accessing the computed process control parameter(s) and operating the process device(s) in accordance therewith.

In one embodiment, the control system provides a feedback, feedforward and/or predictive control of various systems, processes, inputs and/or outputs related to the conversion of carbonaceous feedstock into a gas, so to promote an efficiency of one or more processes implemented in relation thereto. For instance, various process characteristics may be evaluated and controllably adjusted to influence these processes, which may include, but are not limited to, the heating value and/or composition of the feedstock, the characteristics of the product gas (e.g. heating value, temperature, pressure, flow, composition, carbon content, etc.), the degree of variation allowed for such characteristics, and the cost of the inputs versus the value of the outputs. Continuous and/or real-time adjustments to various control parameters, which may include, but are not limited to, heat source power, additive feed rate(s) (e.g. oxygen, oxidants, steam, etc.), feedstock feed rate(s) (e.g. one or more distinct and/or mixed feeds), gas and/or system pressure/flow regulators (e.g. blowers, relief and/or control valves, flares, etc.), and the like, can be executed in a manner whereby one or more process-related characteristics are assessed and optimized according to design and/or downstream specifications.

Alternatively, or in addition thereto, the control system may be configured to monitor operation of the various components of a given system for assuring proper operation, and optionally, for ensuring that the process(es) implemented thereby are within regulatory standards, when such standards apply.

In accordance with one embodiment, the control system may further be used in monitoring and controlling the total energetic impact of a given system. For instance, a a given system may be operated such that an energetic impact thereof is reduced, or again minimized, for example, by optimizing one or more of the processes implemented thereby, or again by increasing the recuperation of energy (e.g. waste heat) generated by these processes. Alternatively, or in addition thereto, the control system may be configured to adjust a composition and/or other characteristics (e.g. temperature, pressure, flow, etc.) of a product gas generated via the controlled process(es) such that such characteristics are not only suitable for downstream use, but also substantially optimized for efficient and/or optimal use. For example, in an embodiment where the product gas is used for driving a gas engine of a given type for the production of electricity, the characteristics of the product gas may be adjusted such that these characteristics are best matched to optimal input characteristics for such engines.

In one embodiment, the control system may be configured to adjust a given process such that limitations or performance guidelines with regards to reactant and/or product residence times in various components, or with respect to various processes of the overall process are met and/or optimized for. For example, an upstream process rate may be controlled so to substantially match one or more subsequent downstream processes.

In addition, the control system may, in various embodiments, be adapted for the sequential and/or simultaneous control of various aspects of a given process in a continuous and/or real time manner.

In general, the control system may comprise any type of control system architecture suitable for the application at hand. For example, the control system may comprise a substantially centralized control system, a distributed control system, or a combination thereof. A centralized control system will generally comprise a central controller configured to communicate with various local and/or remote sensing devices and response elements configured to respectively sense various characteristics relevant to the controlled process, and respond thereto via one or more controllable process devices adapted to directly or indirectly affect the controlled process. Using a centralized architecture, most computations are implemented centrally via a centralized processor or processors, such that most of the necessary hardware and/or software for implementing control of the process is located in a same location.

A distributed control system will generally comprise two or more distributed controllers which may each communicate with respective sensing and response elements for monitoring local and/or regional characteristics, and respond thereto via local and/or regional process devices configured to affect a local process or sub-process. Communication may also take place between distributed controllers via various network configurations, wherein a characteristics sensed via a first controller may be communicated to a second controller for response thereat, wherein such distal response may have an impact on the characteristic sensed at the first location. For example, a characteristic of a downstream product gas may be sensed by a downstream monitoring device, and adjusted by adjusting a control parameter associated with the converter that is controlled by an upstream controller. In a distributed architecture, control hardware and/or software is also distributed between controllers, wherein a same but modularly configured control scheme may be implemented on each controller, or various cooperative modular control schemes may be implemented on respective controllers.

Alternatively, the control system may be subdivided into separate yet communicatively linked local, regional and/or global control subsystems. Such an architecture could allow a given process, or series of interrelated processes to take place and be controlled locally with minimal interaction with other local control subsystems. A global master control system could then communicate with each respective local control subsystems to direct necessary adjustments to local processes for a global result.

The control system of the present invention may use any of the above architectures, or any other architecture commonly known in the art, which are considered to be within the general scope and nature of the present disclosure. For instance, processes controlled and implemented within the context of the present invention may be controlled in a dedicated local environment, with optional external communication to any central and/or remote control system used for related upstream or downstream processes, when applicable. Alternatively, the control system may comprise a sub-component of a regional an/or global control system designed to cooperatively control a regional and/or global process. For instance, a modular control system may be designed such that control modules interactively control various sub-components of a system, while providing for inter-modular communications as needed for regional and/or global control.

The control system generally comprises one or more central, networked and/or distributed processors, one or more inputs for receiving current sensed characteristics from the various sensing elements, and one or more outputs for communicating new or updated control parameters to the various response elements. The one or more computing platforms of the control system may also comprise one or more local and/or remote computer readable media (e.g. ROM, RAM, removable media, local and/or network access media, etc.) for storing therein various predetermined and/or readjusted control parameters, set or preferred system and process characteristic operating ranges, system monitoring and control software, operational data, and the like. Optionally, the computing platforms may also have access, either directly or via various data storage devices, to process simulation data and/or system parameter optimization and modeling means. Also, the computing platforms may be equipped with one or more optional graphical user interfaces and input peripherals for providing managerial access to the control system (system upgrades, maintenance, modification, adaptation to new system modules and/or equipment, etc.), as well as various optional output peripherals for communicating data and information with external sources (e.g. modem, network connection, printer, etc.).

The processing system and any one of the sub-processing systems can comprise exclusively hardware or any combination of hardware and software. Any of the sub-processing systems can comprise any combination of none or more proportional (P), integral (I) or differential (D) controllers, for example, a P-controller, an I-controller, a PI-controller, a PD controller, a PID controller etc. It will be apparent to a person skilled in the art that the ideal choice of combinations of P, I, and D controllers depends on the dynamics and delay time of the part of the reaction process of the gasification system and the range of operating conditions that the combination is intended to control, and the dynamics and delay time of the combination controller. It will be apparent to a person skilled in the art that these combinations can be implemented in an analog hardwired form which can continuously monitor, via sensing elements, the value of a characteristic and compare it with a specified value to influence a respective control element to make an adequate adjustment, via response elements, to reduce the difference between the observed and the specified value. It will further be apparent to a person skilled in the art that the combinations can be implemented in a mixed digital hardware software environment. Relevant effects of the additionally discretionary sampling, data acquisition, and digital processing are well known to a person skilled in the art. P, I, D combination control can be implemented in feed forward and feedback control schemes.

In corrective, or feedback, control the value of a control parameter or control variable, monitored via an appropriate sensing element, is compared to a specified value or range. A control signal is determined based on the deviation between the two values and provided to a control element in order to reduce the deviation. It will be appreciated that a conventional feedback or responsive control system may further be adapted to comprise an adaptive and/or predictive component, wherein response to a given condition may be tailored in accordance with modeled and/or previously monitored reactions to provide a reactive response to a sensed characteristic while limiting potential overshoots in compensatory action. For instance, acquired and/or historical data provided for a given system configuration may be used cooperatively to adjust a response to a system and/or process characteristic being sensed to be within a given range from an optimal value for which previous responses have been monitored and adjusted to provide a desired result. Such adaptive and/or predictive control schemes are well known in the art, and as such, are not considered to depart from the general scope and nature of the present disclosure.

Control Elements

Sensing elements contemplated within the present context, as defined and described above, can include, but are not limited to, elements that monitor gas chemical composition, flow rate and temperature of the product gas, monitor temperature, monitor the pressure, monitor opacity of the gas and various parameters relating to the torch (i.e., torch power and position)

Monitored Parameters

Gasification technologies generally yield a product gas whose $H_2$:CO ratio varies from as high as about 6:1 to as low as about 1:1 with the downstream application dictating the optimal $H_2$:CO ratio. In one embodiment, the resulting $H_2$:CO ratio is 1.1-1.2:1. In one embodiment, the resulting $H_2$:CO ratio is 1.1:1.

The resulting $H_2$:CO ratio in the reformulated gas is dependant on the operating scenario (pyrolytic or with adequate $O_2$/Air), on the processing temperature, the moisture content and the relative C,H content of the feedstock gasified as well as the amount of supplementary carbon feed.

Taking into account one or more of the above factors, the control system of the invention regulates the composition of the reformulated gas over a range of possible $H_2$:CO ratios by adjusting the balance between applied plasma torch heat, air and/or oxygen, carbon and steam thereby allowing reformulated gas composition to be optimized for a specific downstream application.

A number of operational parameters may be regularly or continuously monitored to determine whether the system is operating within the optimal set point. The parameters being monitored may include, but are not limited to, the chemical composition, flow rate and temperature of the product gas, the temperature at various points within the system, the pressure of the system, and various parameters relating to the torch (i.e., torch power and position) and the data are used to determine if there needs to be an adjustment to the system parameters.

The Composition and Opacity of the Reformulated Gas

The product gas can be sampled and analyzed using methods well known to the skilled technician. One method that can be used to determine the chemical composition of the product gas is through gas chromatography (GC) analysis. Sample points for these analyses can be located throughout the system. In one embodiment, the gas composition is measured using a Fourier Transform Infrared (FTIR) Analyser, which measures the infrared spectrum of the gas.

A part of this invention is determining whether too much or too little oxygen is present in the outlet stream and adjusting the process accordingly. In one embodiment, an analyzer or sensor in the carbon monoxide stream detects the presence and concentration of carbon dioxide or other suitable reference oxygen rich material. In one embodiment, oxygen is measured directly.

In one embodiment, the sensors analyze the composition of the reformulated gas for carbon monoxide, hydrogen, hydrocarbons and carbon dioxide and from the data analyzed, a controller sends a signal to the oxygen and/or steam inlets to control the amount of oxygen and/or steam injected into the gas reformulating chamber and/or a signal to the plasma torches In one embodiment, one or more optional opacity monitors are installed within the system to provide real-time feedback of opacity, thereby providing an optional mechanism for automation of process additive input rates, primarily steam, to maintain the level of particulate matter below the maximum allowable concentration.

The Temperature at Various Locations in System

In an embodiment, there is provided means to monitor the temperature of the reformulated gas and the temperature at sites located throughout the system, wherein such data are acquired on a continuous basis. Means for monitoring the temperature in the chamber, for example, may be located on the outside wall of the chamber, or inside the refractory at the top, middle and bottom of the chamber. Additionally, sensors for monitoring the exit temperature of the reformulated gas are provided.

In an embodiment, the means for monitoring the temperature is provided by thermocouples installed at locations in the system as required.

The Pressure of System

In one embodiment, there is provided means to monitor the pressure within the reaction vessel, wherein such data are acquired on a continuous, real time basis. In a further embodiment, these pressure monitoring means comprise pressure sensors such as pressure transducers or pressure taps located anywhere on the reaction vessel, for example on a vertical wall of the reaction vessel.

The Rate of Gas Flow

In an embodiment, there is provided means to monitor the rate of product gas flow at sites located throughout the system, wherein such data are acquired on a continuous basis.

Fluctuations in the gas flow may be the result of non-homogeneous conditions (e.g. torch malfunction or out for electrode change or other support equipment malfunction). As a temporary measure fluctuations in gas flow may be corrected by feedback control of blower speed, feed rates of material, secondary feedstock, air, steam, and torch power. If fluctuations in gas flow persist, the system may be shut down until the problem is solved.

Addition of Process Additives

In an embodiment, the control system comprises response elements to adjust the reactants, including any process additives, to manage the chemical reformulating of input gas to reformulated gas. For example, process additives may be fed into the chamber to facilitate the efficient reformulating of an input gas of a certain chemical composition into a reformulated gas of a different desired chemical composition.

In one embodiment, if the sensors detect excess carbon dioxide in the reformulated gas, the steam and/or oxygen injection is decreased.

Response elements contemplated within the present context, as defined and described above, can include, but are not limited to, various control elements operatively coupled to process-related devices configured to affect a given process by adjustment of a given control parameter related thereto. For instance, process devices operable within the present context via one or more response elements, may include, but are not limited to elements that regulate oxygen source(s) inputs and plasma torch heat.

Adjusting Power to a Torch (Torch Heat)

The process of the invention uses the controllability of plasma torch heat to drive the reaction. Addition of process air into the refining chamber also bears part of the torch heat load by releasing torch heat energy with combustion of reformulated gas. The flow rate of process air is adjusted to keep torch power in a good operating range.

Plasma torch power is adjusted to stabilize the reformulated gas exit temperatures at the design set point. In one embodiment, to ensure that the tars and soot formed in the gasifier are fully decomposed the design set point is about 1000° C.

Adjusting Pressure within the System

In one embodiment, the control system comprises a response element for controlling the internal pressure of the chamber. In one embodiment, the internal pressure is maintained at a negative pressure, i.e., a pressure slightly below atmospheric pressure. For example, the pressure of the reactor will be maintained at about 1-3 mbar vacuum. In one embodiment, the pressure of the system is maintained at a positive pressure.

An exemplary embodiment of such means for controlling the internal pressure is provided by an induction blower in gaseous communication with the GRS. The induction blower thus employed maintains the system at a negative pressure. In systems in which positive pressure is maintained the blower is commanded to operate at lower RPM than the negative pressure case or a compressor may be used.

In response to data acquired by pressure sensors located throughout the system, the speed of the induction blower will be adjusted according to whether the pressure in the system is increasing (whereby the fan will increase in speed) or decreasing (whereby the fan will decrease in speed). Moreover, according to the process of the invention, the system may be maintained under slight negative pressure relative to atmospheric pressure to prevent gases being expelled into the environment.

Pressure can be stabilized by adjusting the reformulated gas blower's speed. Optionally, at speeds below the blower's minimum operating frequency, a secondary control overrides and adjusts the recirculation valve instead. Once the recirculation valve returns to fully closed, the primary control re-engages.

Gasifiers for Use with the GRS

The invention is adapted for use with one or more gasifiers and for use with various types of gasifiers. The gasifier converts carbonaceous feedstock to an input gas product. The stages of the feedstock gasification include: i) drying of the feedstock to remove residual moisture, ii) volatilization of volatile constituents of the dried feedstock to produce a char intermediate, and iii) reformulating of the char to input gas and ash. The gaseous products of the gasification process therefore include the volatile constituents and input gas, which are subjected to the plasma reformation step of the invention to provide the raw reformulated gas product.

Generally, a gasifier comprises a refractory-lined chamber having one or more feedstock inlets, a torch heating means, one or more optional process additive inlets, a gas outlet, and an optional solid residue or slag outlet or removal system.

The gasification process can be carried out in a variety of different gasifiers including the gasifier described below in the example or one of a number of standard gasifiers as are known in the art. Examples of gasifiers known in the art include, but are not limited to entrained flow reactor vessels, fluidized bed reactors, and rotary kiln reactors, each of which is adapted to accept feedstock in the form of solids, particulates, slurry, liquids, gases, or a combination thereof. The gasifier can have a wide range of length-to-diameter ratios and can be oriented either vertically or horizontally.

Figure 10:
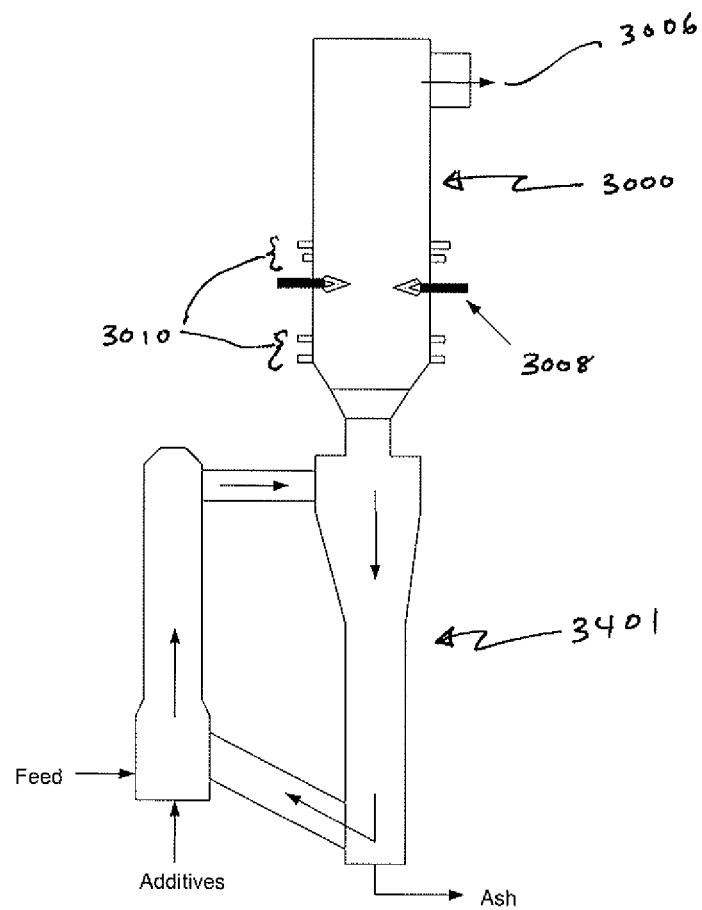
FIG. 10 is a schematic of a transport reactor coupled to one embodiment of the gas reformulating system.

In one embodiment, the gasifier for use with the invention is a transport reactor gasifier 3401 (FIG. 10) which entrained the feedstock in the gas stream and recycles it through the gasification zone to ensure maximum reformulating of feedstock into input gas. The GRS 3000 can optionally be directly coupled to the transport reactor gasifier at the gas exit.

Figure 11:
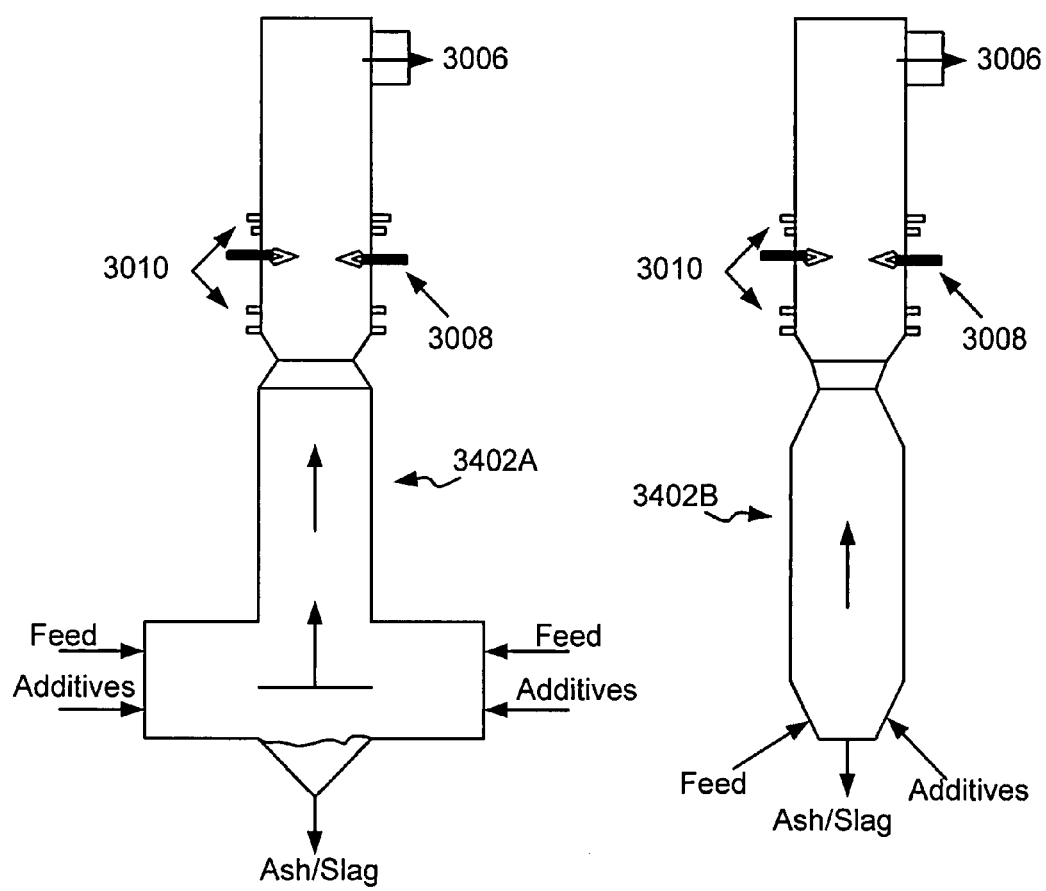
FIG. 11 is a schematic of two entrained flow gasifiers, each coupled to one embodiment of the gas reformulating system.

In one embodiment, the gasifier for use with the invention is an entrained flow gasifier 3402A, 3402B (FIG. 11). The coupling of the GRS 3000 to the entrained flow gasifier will increase the residence time for the reactions to be completed and add a second high temperature zone to further ensure gas quality.

Figure 12:
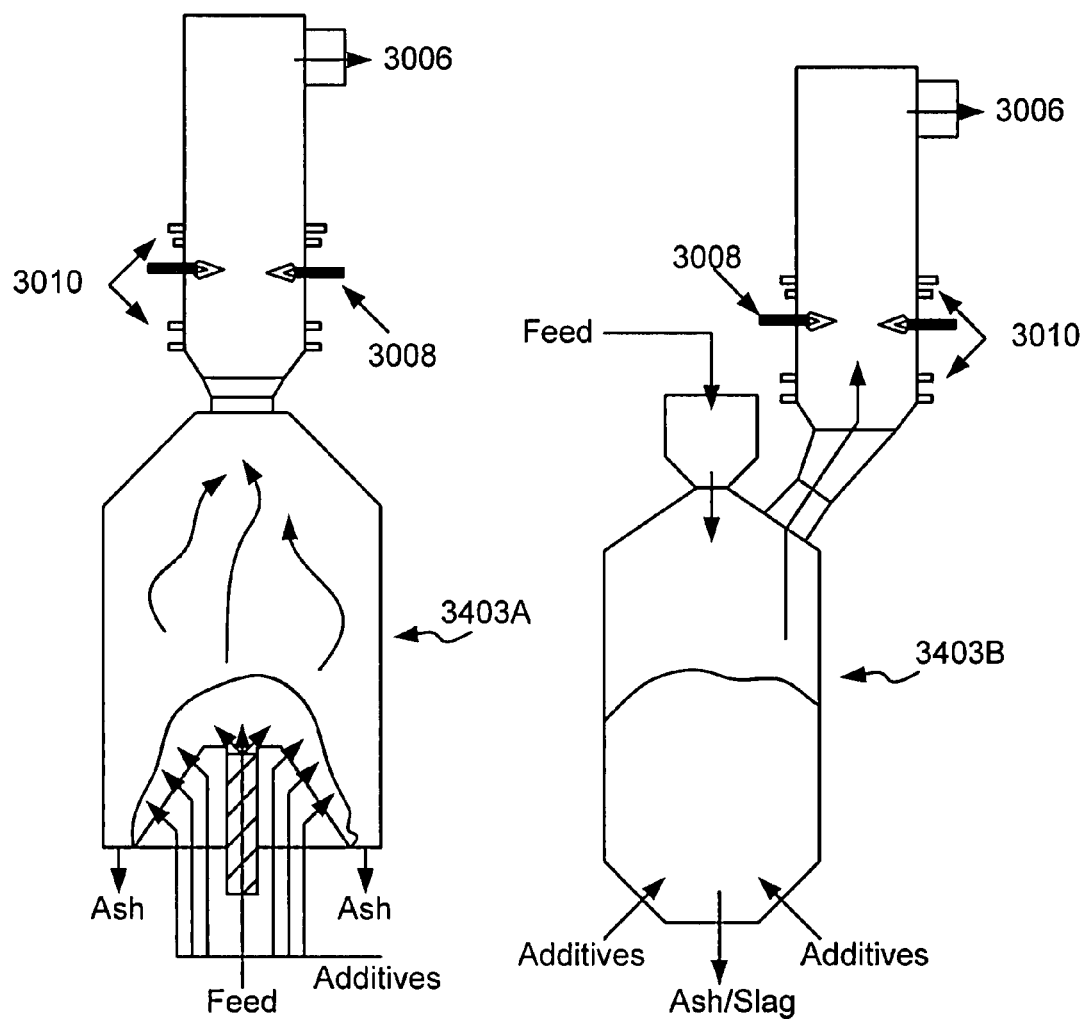
FIG. 12 is a schematic of two fixed bed gasifier, each coupled to one embodiment of the gas reformulating system.

In one embodiment, the gasifier for use with the invention is a fixed bed gasifier 3403A, 3403B (FIG. 12). The fixed bed gasifier can be of multitude of designs which control the flow and characteristics of the pile for gasification (and pyrolysis). The GRS 3000 is coupled to the input gas outlet to ensure complete reaction of the gas to simpler gas molecules.

Figure 13:
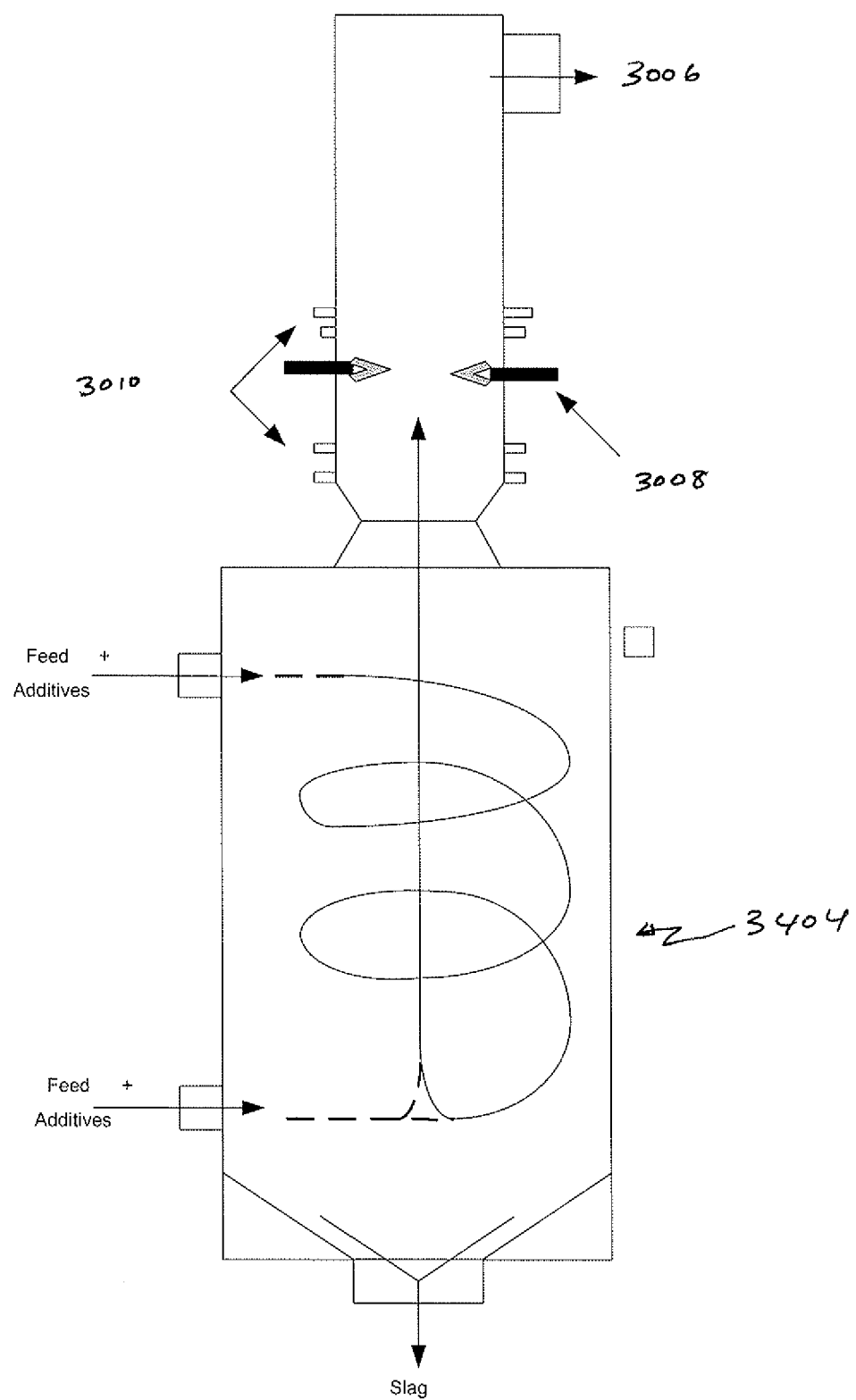
FIG. 13 is a schematic of a cyclonic gasifier coupled to one embodiment of the gas reformulating system.
Figure 14:
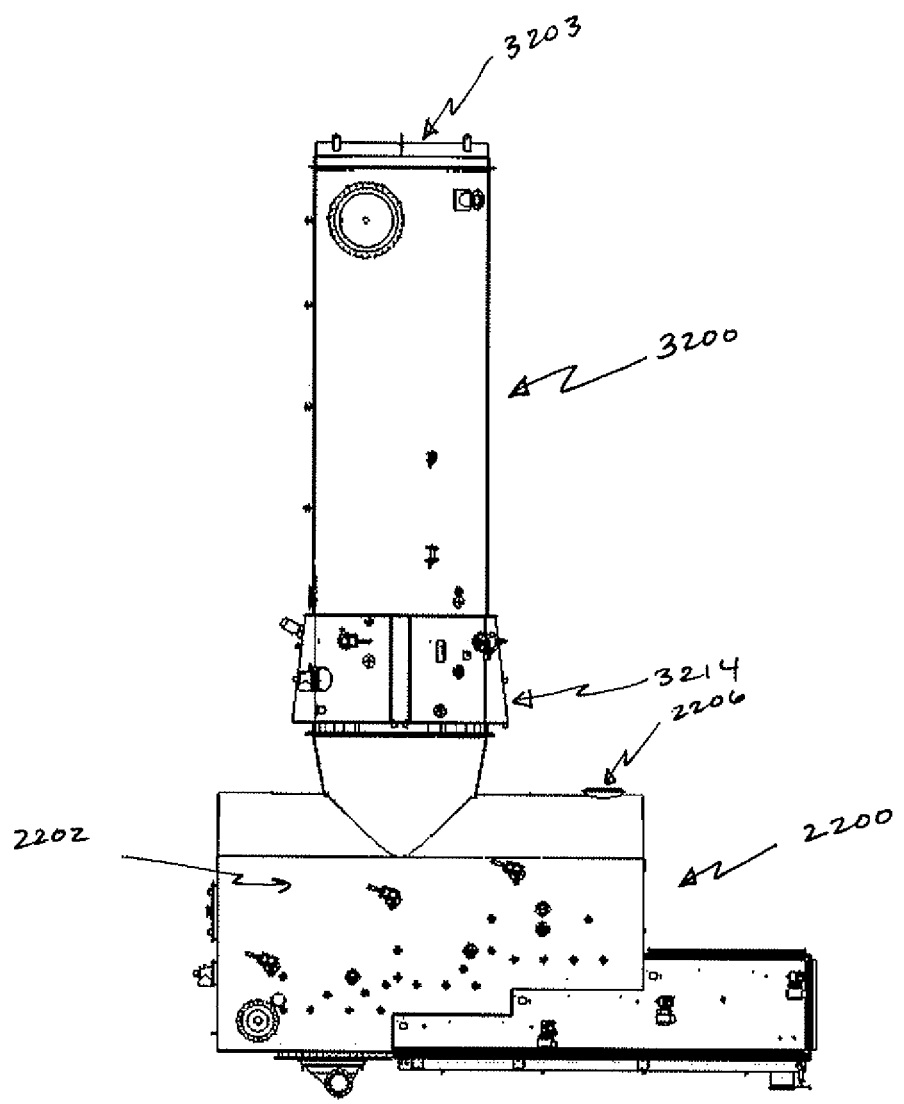
FIG. 14 is a schematic of a horizontally-oriented gasifier comprising one embodiment of the gas reformulating system including the gas reformulating chamber of FIG. 5.
Figure 15:
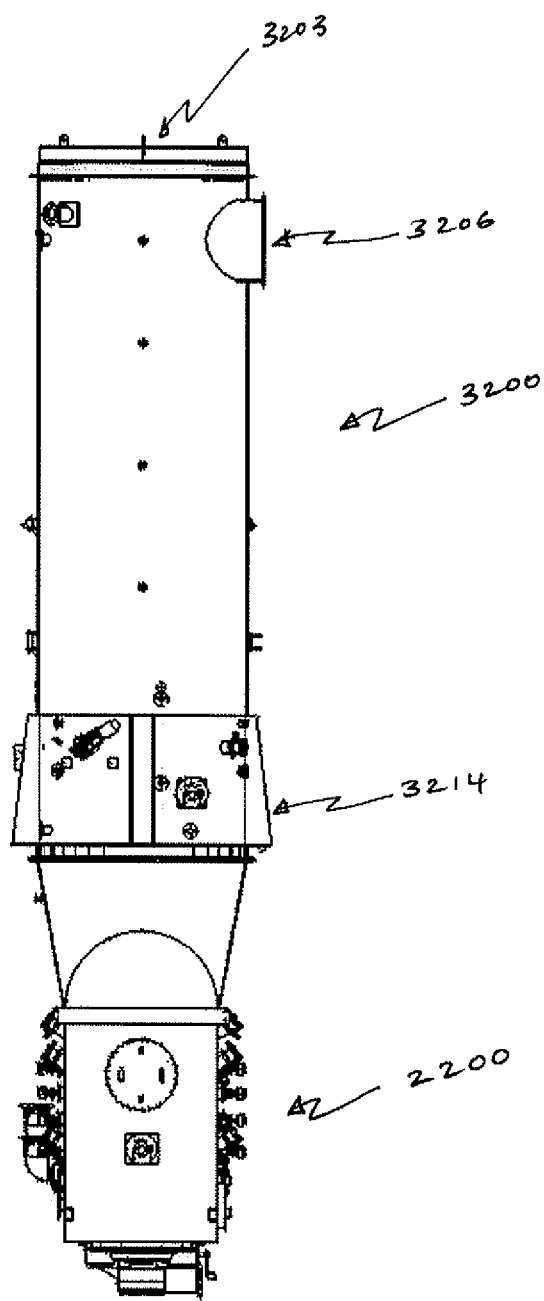
FIG. 15 is an alternative view of the gasifier and gas reformulating system of FIG. 14.
Figure 16:
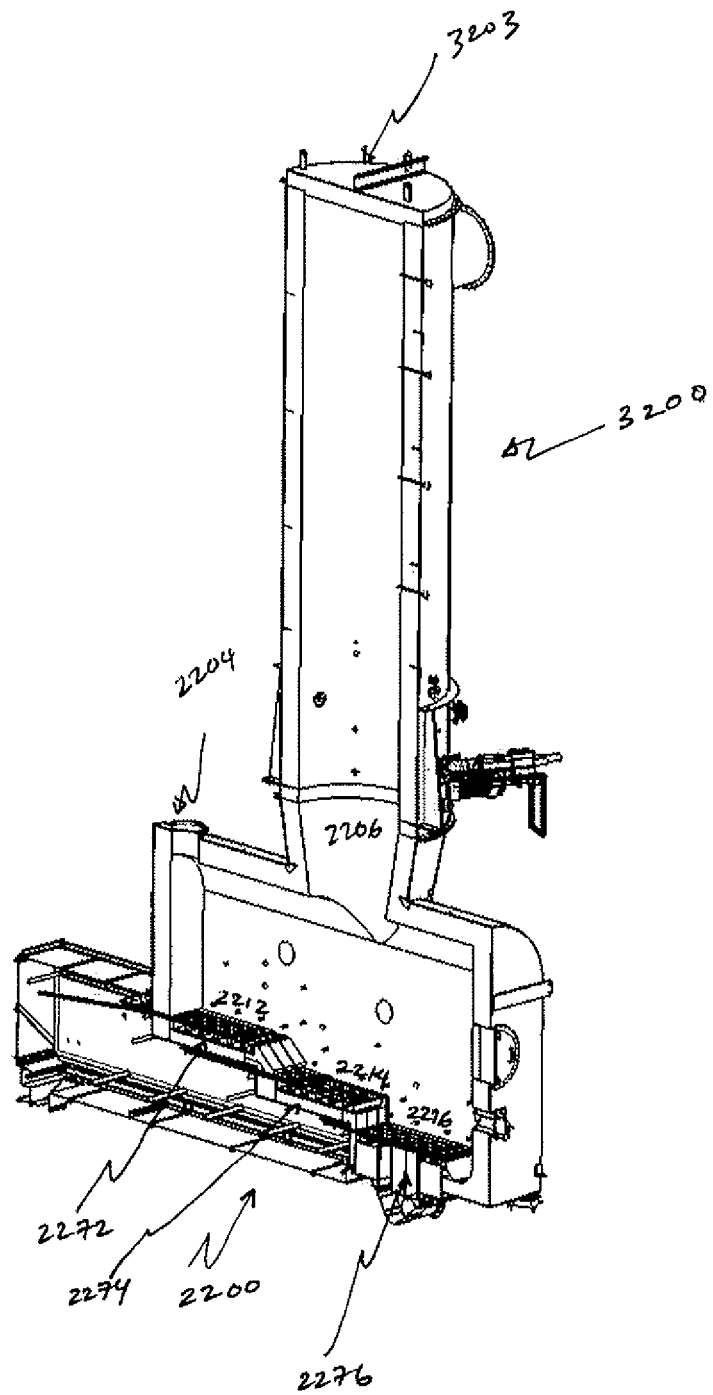
FIG. 16 is a cross sectional view of the gasifier and gas reformulating system of FIG. 14.
Figure 17:
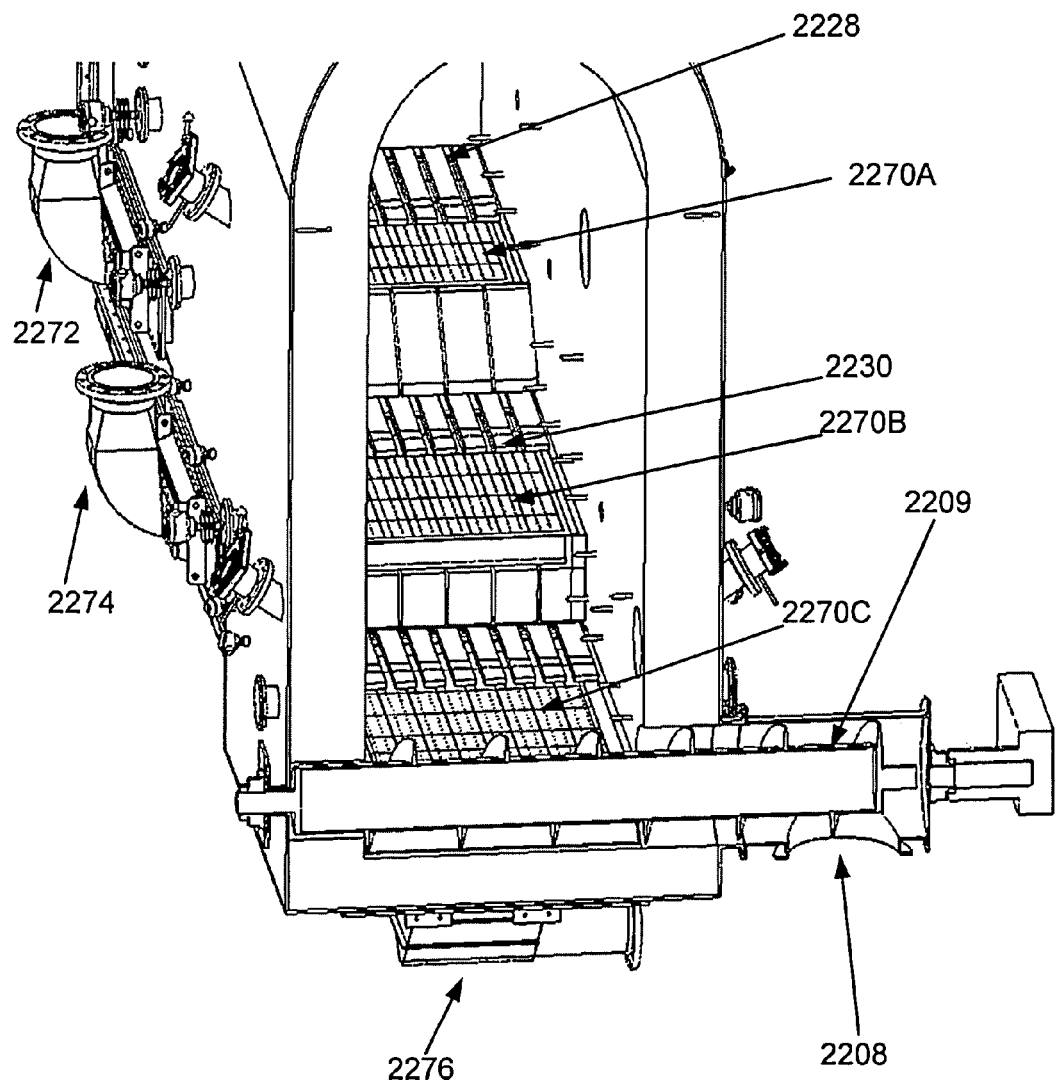
FIG. 17 illustrates a blown up cross sectional view of the gasifier shown in FIG. 14 detailing the air boxes, carrier ram fingers, ash extractor screw and serrated edge of step C.
Figure 18:
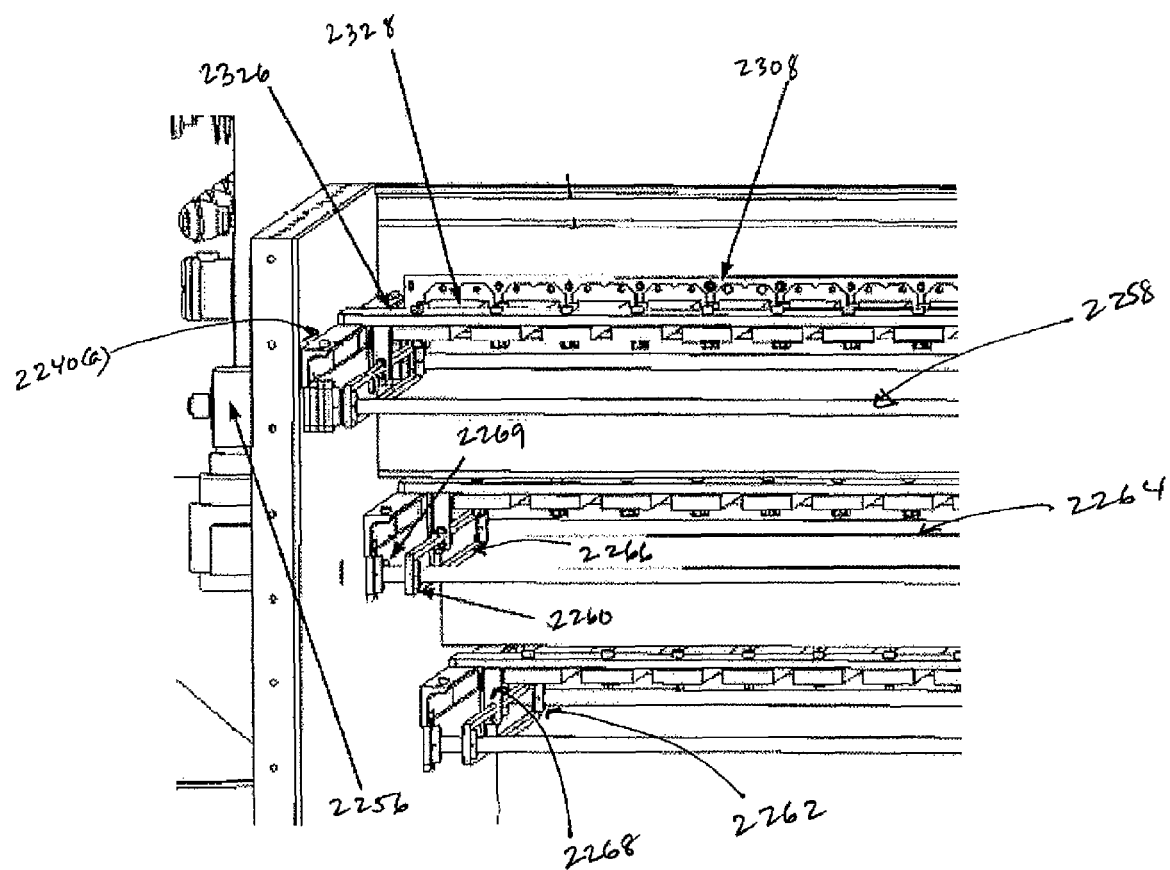
FIG. 18 details the carrier ram enclosure of the gasifier illustrated in FIG. 14.

In one embodiment, the gasifier for use with the invention is a cyclone gasifier 3404 (FIG. 13).

Example

FIGS. 14 to 18 show a converter incorporating an embodiment of the GRS comprising the gas reformulating chamber shown in FIG. 5.

The gasifier 2200 comprises a refractory-lined horizontally-oriented stepped-floor gasification chamber 2202 having a feedstock input 2204, gas outlet 2206 and a solid residue outlet 2208. The gasification chamber 2202 is a refractory-lined steel weldment having a stepped floor with a plurality of floor levels 2212, 2214, 2216.

The solid residue outlet is equipped with an ash extractor comprising an extractor screw 2209 which will pull the ash out of the gasifier and feed it into an ash conveyor system.

Each step has a perforated floor 2270 through which heated air can be introduced. To avoid blockage of the air holes during processing, the air hole size is selected such that it creates a restriction and thus a pressure drop across each hole. This pressure drop is sufficient to prevent waste particles from entering the holes.

The air feed for each level or step is independently controllable. Independent air feed and distribution through the perforated floor 2270 is achieved by a separate air box 2272, 2274, 2276 which forms the floor of each step.

Movement through the steps is facilitated by a series of multiple-finger carrier rams 2228, 2230, 2232, with the floor of each step being serviced by a single multiple-finger carrier ram. The series of carrier rams further allows for the control of the height of the pile at each step and the total residence time of the reactant material in the gasification chamber. Each ram is capable of movement over the full or partial length of that step, at variable speeds.

Each ram unit comprises an externally mounted guide portion, a multiple finger ram having optional guide portion engagement members, externally mounted drive system and an externally mounted control means. The guide portion comprises a pair of generally horizontal, generally parallel elongated tracks 2240(*a*), 2240(*b*) (not shown) mounted on a frame. Each of the tracks has a substantially L-shaped cross-section. The ram comprises a ram body 2326 and a series of elongated, substantially rectangular ram fingers 2328 sized to slidably move through corresponding sealable opening in the chamber wall.

Power to propel the rams along the tracks is supplied by a externally mounted electric variable speed motor 2256 which drives a motor output shaft 2258 selectably in the forward or reverse direction allowing for extension and retraction of the ram at a controlled rate. Position sensors 2269 transmit ram position information to the control system. Optionally, the motor may further comprise a gear box. Two driver sprocket gears 2260 are mounted on the motor output shaft. The driver sprockets 2260 and corresponding driven sprockets 2262 mounted on an axle 2264 operatively mesh with chain members 2266 which are secured by brackets 2268 to the elongated rectangular block 2244.

In the step-floor gasifier, conditions at the individual steps are optimized for different degrees of drying, volatilization and carbon reformulating.

The feedstock is introduced into the chamber, onto the first step via the feedstock input (421). The normal temperature range for this step (as measured at the bottom of the material pile) lies between 300 and 900° C. The major process here is that of drying with some volatilization and carbon conversion.

Step II is designed to have a bottom temperature range between 400 and 950° C. The main process is that of volatilization with a small degree (the remainder) of the drying operation as well as a substantial amount of carbon conversion.

Step III temperature range lies between 600 and 1000° C. The major process in Step III is that of carbon conversion with a lesser amount (the remainder) of volatilization.

As the solid feed material progresses through the chamber it loses its mass and volume as its volatile fraction is volatilized to form input gas and the resulting char is reacted to form additional input gas and ash.

The unrefined input gas exits through the gas outlet 2206 of the gasifier 2200 into the GRS 3200 which is sealably coupled to the gasifier via a mounting flange 3214 which directly connects the gasifier gas outlet with the single conically shaped input gas inlet of the GRS. Air is injected into the input gas stream through swirl ports 3212 to create a swirling motion or turbulence in the input gas stream thereby mixing the input gas and creating a re-circulating vortex pattern within the GRS. The residence time of the gas within the GRS is about 1.2 seconds Referring to FIG. 5, the GRS comprises a substantially vertically mounted refractory-lined cylindrical chamber having a length-to-diameter ration of about 3:1 and a single conically shaped input gas inlet to which the gasifier is connected to via a mounting flange 3214. The chamber is capped with a refractory-lined lid 3203 thereby creating a sealed gas reformulating chamber 3202.

The gas reformulating chamber comprises various ports including one or more ports for heaters 3216, one or more ports for one or more oxygen sources 3210, and optionally one or more access or view ports 3326 and/or instrumentation ports 3226. In addition, the gas reformulating chamber is equipped with lifting points 3230.

The refractory used on the wall of the chamber is a multi-layer design with a high density layer on the inside to resist the high temperature, erosion and corrosion that is present in the chamber, a middle lower density material layer with lower resistance properties but higher insulation factor and an outer very low density foam board layer with very high insulation factor. The outside layer, between the foam board and the vessel steel shell is a ceramic blanket material to provide a compliant layer to allow for differential expansion between the solid refractory and the vessel shell. Vertical expansion of the refractory is provided for by means of a compressible refractory layer separating sections of the non-compressible refractory. The compressible layer is protected from erosion by overlapping but extendible high density refractory.

Figure 19:
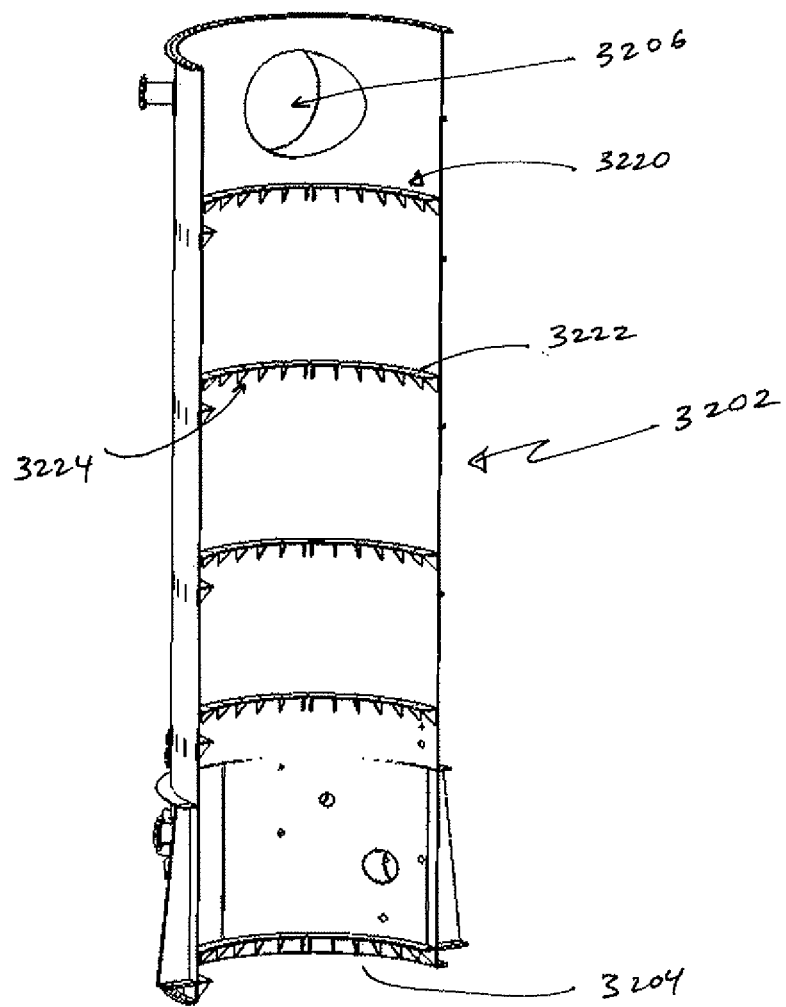
FIG. 19 is a cross sectional view of the gas reformulating chamber of FIG. 5 detailing the refractory supports.
Figure 20:
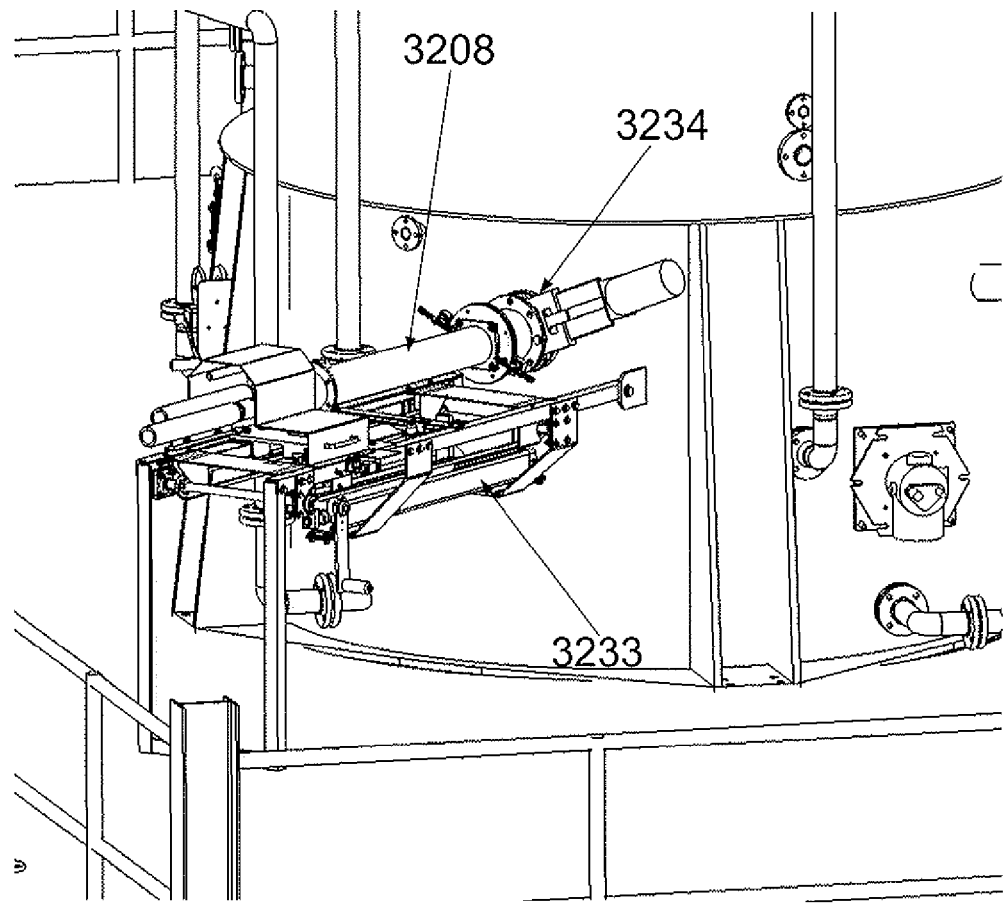
FIG. 20 is a schematic of a portion of the gas reformulating system of Example 1 detailing the torch mounting system and according to an embodiment of the invention.

Referring to FIG. 19, the gas reformulating chamber further comprises a refractory support system comprising a series of circumferential extending shelves 3220. Each shelf is segmented and includes gaps to allow for expansion. Each shelf segment 3222 is supported by a series of support brackets 3224.

In this embodiment of the GRS, the one or more inputs for one or more oxygen source(s) include air and steam inputs.

The GRS further comprises three levels of tangentially positioned air nozzles, two tangentially located plasma torches, six thermocouple ports, two burner ports, two pressure transmitter ports and several spare ports.

Referring to FIG. 9, air is injected into the gas stream by three levels of air nozzles that include four jets at the lower level 3212 and another six jets at upper level 3211 in which three jets are slightly higher than other three to create cross-jet mixing effects to achieve better mixing.

The GRS further includes two-tangentially mounted 300 kW, water cooled, copper electrode, NTAT, DC plasma torches mounted on a sliding mechanism. The two plasma torches are located above the air nozzles to provide maximum exposure to plasma torch heat (see FIG. 9, 3216).

The plasma power supply converts three phase AC power into DC power for each plasma torch. As an intermediate step, the unit first converts the three phase AC input into a single high frequency phase. This allows for better linearization of the eventual DC output in the chopper section. The unit allows output DC voltage is allowed to fluctuate in order to maintain stable DC current.

Each plasma torch 3208 is mounted on a sliding mechanism that can move the torch 3208 into and out of the gas reformulating chamber. The torch 3208 is sealed to the gas reformulating chamber 3202 by means of a sealing gland. This gland is sealed against a gate valve, which is, in turn, mounted on and sealed to the vessel. To remove a torch 3208, it is pulled out of the reformulating chamber 3202 by the slide mechanism. Initial movement of the slide disables the high voltage torch power supply for safety purposes. The gate valve shuts automatically when the torch 3208 has retracted past the valve and the coolant circulation is stopped. The hoses and cable are disconnected from the torch 3208, the gland is released from the gate valve and the torch 3208 is lifted away by a hoist.

Replacement of a torch 3208 is done using the reverse of the above procedure; the slide mechanism can be adjusted to permit variation of the insertion depth of the torch 3208. The gate valve is operated mechanically so that operation is automatic. A pneumatic actuator 3233 is used to automatically withdraw the torch in the event of cooling system failure. Compressed air for operating the actuator is supplied from a dedicated air reservoir so that power is always available even in the event of electrical power failure. The same air reservoir provides the air for the gate valve 3234. An electrically interlocked cover is used a further safety feature by preventing access to the high voltage torch connections.

Thermocouples are positioned at various locations with the gas reformulating chamber such that the temperature of the reformulated gas within the GRS is maintained at about 1000° C. and if it falls below this temperature power to the plasma torches or air injection is increased.

In this embodiment, the air flow at each step is pre-set to maintain substantially constant temperature ranges and ratios between steps. For example, about 36% of the total air flow may be directed to Step A, about 18% to Step B, and about 6% to Step C, the remainder being directed to an attached GRS (e.g. 40% of total air flow). Alternatively, air input ratios may be varied dynamically to adjust temperatures and processes occurring within each step of the gasifier and/or GRS The molecules within the gaseous mixture within the gas reformulating chamber disassociate into their constituent elements in the plasma arc zone and then reformed into reformulated gas. The hot crude reformulated gas exits the GRS via the reformulated gas outlet 3206.

The invention being thus described, it will be apparent that the same may be varied in many ways. Such variations are not to be regarded as a departure from the spirit and scope of the invention, and all such modifications as would be apparent to one skilled in the art are intended to be included within the scope of the following claims.

The embodiments of the invention in which an exclusive property or privilege is claimed are defined as follows:

1. A method for reformulating of an input gas from a low temperature gasification reaction into a carbon monoxide containing reformulated gas of a defined chemical composition, comprising the steps of
   (a) delivering the input gas from a low temperature gasifier to an inlet of a refractory-lined chamber;
   (b) injecting air and process additives into said chamber such that the input gas mixes with the air and process additives;
   (c) applying plasma heat from one or more plasma heat sources to the mixed input gas, air and process additives to promote dissociation of molecules therein;
   (d) allowing recombination of said dissociated molecules thereby producing reformulated gas; and
   (e) continually monitoring the composition of said reformulated gas produced in step (d) and, via feedback contra continually adjusting, in response to the monitored composition, (i) air and process additives injection rate in step (b) and (ii) the power to the one or more plasma heat sources, thereby producing said carbon monoxide containing reformulated gas of a defined chemical composition.

2. The method of claim 1, further comprising imparting turbulence during steps (c) and/or (d).

3. The method of claim 1, wherein the one or more process additives are selected from steam, carbon dioxide and hydrocarbons.

4. A method for converting an input gas from a low temperature gasification reaction into a product gas having a $H_2$:CO ratio optimized for a downstream application, the method comprising the steps of:
   (a) applying plasma heat from one or more plasma heat sources to the input gas from a low temperature gasifier in the presence of air to dissociate molecules therein;
   (b) adding one or more process additives to the input gas;
   (c) allowing the dissociated molecules to recombine to provide a product gas;
   (d) imparting turbulence during steps (a), (b) and/or (c);
   (e) continually monitoring the $H_2$:CO ratio of the product gas and continually comparing the $H_2$:CO ratio of the product gas to a pre-determined range; and
   (f) in response to step (d) continually adjusting, via feedback control, (i) power to the one or more plasma sources, (ii) the amount of air of step (a) and (iii) the process additives of step (b) to produce product gas having a $H_2$:CO ratio within the predetermined range.

5. The method of claim 1, wherein the one or more process additives are selected from steam, carbon dioxide and hydrocarbons.

6. The method of claim 1, wherein the $H_2$:CO ratio is 1.1-2:1.

7. The method of claim 1, wherein in step (c) plasma heat is applied such that the temperature is about 1000° C. to 1200° C.

8. The method of claim 1, wherein input gas is from a low temperature gasifier having a operating temperature between less than about 1000° C.

9. The method of claim 4, wherein input gas is from a low temperature gasifier having a operating temperature less than about 1000° C.

10. The method of claim 1, wherein monitoring and adjusting is in real time.

11. The method of claim 4, wherein monitoring and adjusting is in real time.

12. The method of claim 4, wherein the $H_2$:CO ratio is between 1:1 to 6:1.

13. The method of claim 1, wherein the gas exit temperature is about 1000° C.

14. The method of claim 4, wherein the gas exit temperature is about 1000° C.

15. The method of claim 1, wherein the one or more process additives is i) steam and ii) carbon dioxide and/or hydrocarbons.

16. The method of claim 4, wherein the one or more process additives is steam and ii) carbon dioxide and/or hydrocarbons.

17. The method of claim 1, wherein the feedback control further comprises monitoring flow rate.

18. The method of claim 4, wherein the feedback control further comprises monitoring flow rate.

19. The method of claim 1, wherein the feedback control comprises triggering adjustment of inputs and conditions of the gasification reaction in response to the monitored composition of the product gas.

20. The method of claim 4, wherein the feedback control comprises triggering adjustment of inputs and conditions of the gasification reaction in response to the monitored $H_2$:CO ratio of the product gas.

* * * * *

UNITED STATES PATENT AND TRADEMARK OFFICE
CERTIFICATE OF CORRECTION

PATENT NO.         : 8,475,551 B2              Page 1 of 1
APPLICATION NO.    : 11/745414
DATED              : July 2, 2013
INVENTOR(S)        : Andreas Tsangaris et al.

It is certified that error appears in the above-identified patent and that said Letters Patent is hereby corrected as shown below:

In the Claims

Column 25, line 7, delete "between".

Signed and Sealed this
Third Day of June, 2014

Michelle K. Lee
*Deputy Director of the United States Patent and Trademark Office*